United States Patent
Farrell et al.

(10) Patent No.: US 10,639,851 B2
(45) Date of Patent: May 5, 2020

(54) MARKED THERMOPLASTIC COMPOSITIONS, METHODS OF MAKING AND ARTICLES COMPRISING THE SAME, AND USES THEREOF

(71) Applicant: SABIC GLOBAL TECHNOLOGIES, B.V., Bergen op Zoom (NL)

(72) Inventors: Tony Farrell, Bergen op Zoom (NL); Robin Alphonsus Adriana van der Scheer, Bergen op Zoom (NL); Cornelis Johannes Gerardus Maria van Peer, Bergen op Zoom (NL)

(73) Assignee: SABIC GLOBAL TECHNOLOGIES IP B.V., Bergen op Zoom (NL)

( * ) Notice: Subject to any disclaimer, the term of this patent is extended or adjusted under 35 U.S.C. 154(b) by 107 days.

(21) Appl. No.: 15/072,696

(22) Filed: Mar. 17, 2016

(65) Prior Publication Data

US 2016/0193864 A1    Jul. 7, 2016

Related U.S. Application Data

(60) Division of application No. 13/909,378, filed on Jun. 4, 2013, now Pat. No. 9,662,833, which is a (Continued)

(51) Int. Cl.
*B29C 65/16* (2006.01)
*B29C 65/00* (2006.01)
(Continued)

(52) U.S. Cl.
CPC ........ *B29C 66/306* (2013.01); *B29C 65/1606* (2013.01); *B29C 65/1609* (2013.01);
(Continued)

(58) Field of Classification Search
CPC ........ B24D 25/23; B24D 25/21; B24D 25/25; B24D 25/26; B24D 25/27; B24D 25/33;
(Continued)

(56) References Cited

U.S. PATENT DOCUMENTS

| | | |
|---|---|---|
| 5,268,321 A | 12/1993 | Shimizu et al. |
| 5,576,377 A | 11/1996 | El Sayed et al. |

(Continued)

FOREIGN PATENT DOCUMENTS

| | | |
|---|---|---|
| EP | 0566312 A1 | 10/1993 |
| EP | 1925427 A1 | 5/2008 |

(Continued)

OTHER PUBLICATIONS

Bruce M. Mulholland, "Lasermarkable Engineering Resins"; Ticona Performance Driven Solutions; 2009; 9 pages.

(Continued)

*Primary Examiner* — Ling Siu Choi
*Assistant Examiner* — David L Miller
(74) *Attorney, Agent, or Firm* — Cantor Colburn LLP

(57) ABSTRACT

An article for laser marking can comprising: a thermoplastic composition comprising a thermoplastic polymer, an active component comprising at least one of a polymeric unit and an additive, wherein the thermoplastic polymer has a visible transmission of greater than or equal to 80% according to ASTM D1003-00, Procedure A, using D65 illumination, 10 degrees observer, and thickness of 1 mm; and a mark produced by chemical rearrangement of the active component generated by a laser of a first wavelength; wherein the mark exhibits at least one of: (i) a change in optical properties in the region 400 nm to 700 nm when exposed to light having a wavelength less than or equal to 500 nm; and (ii) a change in optical properties in the region of 400 nm to (Continued)

700 nm when exposed to light having a wavelength greater than or equal to the first wavelength.

19 Claims, 10 Drawing Sheets

Related U.S. Application Data continuation-in-part of application No. 13/487,641, filed on Jun. 4, 2012, now Pat. No. 9,168,696.

(51) Int. Cl.

| | | |
|---|---|---|
| *B42D 25/29* | (2014.01) | |
| *B41M 5/26* | (2006.01) | |
| *B29C 65/82* | (2006.01) | |
| *B41M 3/10* | (2006.01) | |
| *B42D 25/23* | (2014.01) | |
| *B42D 25/27* | (2014.01) | |
| *B42D 25/25* | (2014.01) | |
| *B42D 25/41* | (2014.01) | |
| *B42D 25/26* | (2014.01) | |
| *B42D 25/333* | (2014.01) | |
| *B42D 25/378* | (2014.01) | |
| *B42D 25/405* | (2014.01) | |
| *B41J 2/455* | (2006.01) | |
| *D21H 21/48* | (2006.01) | |
| *B42D 25/21* | (2014.01) | |
| *B42D 25/435* | (2014.01) | |
| *B41J 2/475* | (2006.01) | |
| *B41M 3/14* | (2006.01) | |
| *B41M 5/00* | (2006.01) | |
| *B29L 17/00* | (2006.01) | |
| *C08K 5/00* | (2006.01) | |
| *B29K 101/12* | (2006.01) | |
| *B29K 105/00* | (2006.01) | |
| *B29L 9/00* | (2006.01) | |

(52) U.S. Cl.
CPC ...... *B29C 65/1616* (2013.01); *B29C 65/1635* (2013.01); *B29C 65/1677* (2013.01); *B29C 65/8253* (2013.01); *B29C 66/1122* (2013.01); *B29C 66/41* (2013.01); *B29C 66/43* (2013.01); *B29C 66/7392* (2013.01); *B29C 66/73341* (2013.01); *B29C 66/73921* (2013.01); *B29C 66/836* (2013.01); *B41J 2/455* (2013.01); *B41J 2/475* (2013.01); *B41M 3/10* (2013.01); *B41M 3/14* (2013.01); *B41M 5/0052* (2013.01); *B41M 5/0064* (2013.01); *B41M 5/267* (2013.01); *B42D 25/21* (2014.10); *B42D 25/23* (2014.10); *B42D 25/25* (2014.10); *B42D 25/26* (2014.10); *B42D 25/27* (2014.10); *B42D 25/29* (2014.10); *B42D 25/333* (2014.10); *B42D 25/378* (2014.10); *B42D 25/405* (2014.10); *B42D 25/41* (2014.10); *B42D 25/435* (2014.10); *D21H 21/48* (2013.01); *B29C 66/71* (2013.01); *B29K 2101/12* (2013.01); *B29K 2105/256* (2013.01); *B29K 2995/0027* (2013.01); *B29L 2009/00* (2013.01); *B29L 2017/006* (2013.01); *C08K 5/0041* (2013.01); *Y10T 428/24802* (2015.01)

(58) Field of Classification Search
CPC ........ B24D 25/333; B24D 25/41; B41J 2/455; B41M 3/10; B41M 5/267; B29C 66/306; Y10T 428/24802; B42D 25/23; B42D 25/21; B42D 25/25; B42D 25/26; B42D 25/27; B42D 25/33; B42D 25/333; B42D 25/41

See application file for complete search history.

(56) References Cited

U.S. PATENT DOCUMENTS

| | | | |
|---|---|---|---|
| 5,728,994 A | 3/1998 | Hutton | |
| 5,804,353 A | 9/1998 | Cushner et al. | |
| 5,977,514 A * | 11/1999 | Feng | B41M 5/267 |
| | | | 219/121.69 |
| 6,072,011 A | 6/2000 | Hoover | |
| 6,207,344 B1 | 3/2001 | Ramlow et al. | |
| 6,420,449 B1 | 7/2002 | Sagane et al. | |
| 6,627,299 B1 | 9/2003 | Feng et al. | |
| 6,631,977 B2 | 10/2003 | Andrews | |
| 6,723,864 B2 | 4/2004 | Silva et al. | |
| 7,172,803 B2 | 2/2007 | Raupach et al. | |
| 7,220,479 B2 | 5/2007 | Lutz et al. | |
| 7,223,512 B2 | 5/2007 | Lutz et al. | |
| 7,459,259 B2 * | 12/2008 | Engel | B41M 5/267 |
| | | | 430/270.1 |
| 8,343,412 B2 | 1/2013 | Klein et al. | |
| 8,603,633 B2 | 12/2013 | Sakagami et al. | |
| 9,168,696 B2 | 10/2015 | Farrell | |
| 9,662,833 B2 * | 5/2017 | Farrell | B29C 66/306 |
| 2003/0234286 A1 * | 12/2003 | Labrec | B41M 3/14 |
| | | | 235/380 |
| 2004/0026555 A1 | 2/2004 | Drinkrow | |
| 2004/0039145 A1 | 2/2004 | Silva et al. | |
| 2004/0055492 A1 | 3/2004 | Van Den Elshout et al. | |
| 2004/0059068 A1 | 3/2004 | Nodera | |
| 2004/0132892 A1 | 7/2004 | Kawakami et al. | |
| 2005/0217790 A1 | 10/2005 | Joachimi et al. | |
| 2006/0251996 A1 | 11/2006 | Bogerd et al. | |
| 2007/0068630 A1 | 3/2007 | Griffin et al. | |
| 2007/0274559 A1 | 11/2007 | Depta et al. | |
| 2008/0050663 A1 * | 2/2008 | Kawakami | B32B 27/18 |
| | | | 430/14 |
| 2008/0124498 A1 * | 5/2008 | Cole | B41M 5/267 |
| | | | 428/29 |
| 2009/0029121 A1 * | 1/2009 | Hammermann | B41M 5/267 |
| | | | 428/195.1 |
| 2009/0130451 A1 | 5/2009 | Farrell | |
| 2011/0200801 A1 | 8/2011 | Pudleiner et al. | |
| 2012/0187672 A1 | 7/2012 | Sakagami et al. | |
| 2012/0316280 A1 | 12/2012 | Meyer et al. | |
| 2013/0323476 A1 | 12/2013 | Farrell et al. | |
| 2017/0043530 A1 | 2/2017 | Farrell et al. | |

FOREIGN PATENT DOCUMENTS

| | | | | |
|---|---|---|---|---|
| EP | 2305460 A1 | 4/2011 | | |
| EP | 2399740 A1 * | 12/2011 | ............ | B32B 27/08 |
| JP | 1016390 A | 1/1998 | | |
| JP | 2001164082 A | 6/2001 | | |
| JP | 2002003548 A | 1/2002 | | |
| JP | 2002309104 A | 10/2002 | | |
| JP | 2003321615 A | 11/2003 | | |
| JP | 2009012276 A | 1/2009 | | |
| JP | 2009270002 A | 11/2009 | | |
| JP | WO 2010095747 A1 * | 8/2010 | ............ | B32B 27/08 |
| WO | 0109230 A1 | 2/2001 | | |
| WO | 01023189 A1 | 4/2001 | | |
| WO | 2006087967 A1 | 8/2006 | | |
| WO | 2011103200 A2 | 8/2011 | | |

OTHER PUBLICATIONS

International Publication No. 2006087967 (A1); Publication Date: Aug. 24, 2006; Abstract Only; 1 Page.
International Search Report; International Application No. PCT/IB2013/054610; International Filing Date: Jun. 4, 2013; dated Oct. 8, 2013; 5 Pages.

(56) References Cited

OTHER PUBLICATIONS

Japanese Patent No. 1016390 (A); Publication Date: Jan. 20, 1998; Abstract Only; 1 Page.
Japanese Patent No. 2001164082 (A); Publication Date: Jun. 29, 2001; 1; Abstract Only, 1 Page.
Japanese Patent No. 2001164082; Publication Date: Jun. 19, 2001; Abstract Only, 1 page.
Japanese Patent No. 2002003548 (A); Publication Date: Jan. 9, 2002; Abstract Only; 1 Page.
Japanese Patent No. 2002309104 (A); Publication Date: Oct. 23, 2002; Abstract Only, 1 Page.
Japanese Patent No. 2002309104; Publication Date: Oct. 23, 2002; Abstract Only, 1 page.
Japanese Patent No. 2003321615 (A); Publication Date: Nov. 14, 2003; Abstract Only; 1 Page.
Japanese Patent No. 2009012276 (A); Publication Date: Jan. 22, 2009; Abstract Only; 2 Pages.
Japanese Patent No. 2009270002 (A); Publication Date: Nov. 19, 2009; Abstract Only; 1 Page.
World Intellectual Property Organization Publication No. 2006087967; Publication Date: Aug. 24, 2006; Abstract Only, 1 page.
Written Opinion of the International Searching Authority; International Application No. PCT/IB2013/054610; International Filing Date: Jun. 4, 2013; dated Oct. 8, 2013; 8 Pages.

\* cited by examiner

MARKED THERMOPLASTIC COMPOSITIONS, METHODS OF MAKING AND ARTICLES COMPRISING THE SAME, AND USES THEREOF

CROSS REFERENCE TO RELATED APPLICATIONS

This application is a divisional of U.S. application Ser. No. 13/909,378, filed Jun. 4, 2013 which is a continuation-in-part of U.S. application Ser. No. 13/487,641, filed Jun. 4, 2012, which are hereby incorporated by reference in their entirety.

TECHNICAL FIELD

The present disclosure relates to marked thermoplastic compositions and methods of making and using the same.

BACKGROUND

A range of lasers operating at various wavelengths can be used to inscribe or mark thermoplastic compositions with text, logos, and/or other identifiers. For example, opaque thermoplastic compositions can be marked with a 1064 nanometer (nm) laser light and rely on heat build-up in the substrate as the method of interaction between the laser light and the thermoplastic composition. Depending on the composition and/or the lasering parameters, the heat generated either causes a char, i.e., carbonization, to form a dark mark, or, alternatively a swelling from the formation of voids just below the surface and yields a light colored mark on a dark background, i.e., foaming. A vaporization process, or the bleaching of an additive, or a bleaching of the combination of additives, can also achieve light colored marks by exposing the lighter colored, thermally stable materials below the surface. The 1064 nm laser is also used to mark transparent compositions to give a dark mark. However, the inherent low levels of absorption by most thermoplastics in this area of the electromagnetic spectrum (i.e., 500 nm to 1,200 nm) can lead to inhomogeneous interactions between the laser light and the transparent substrate, which can lead to localized superheating and an inconsistent or poor quality mark. As a consequence, low levels of carbon black or other more specialized near infrared absorbing pigments or additives are often required in order to increase the quality and consistency of the mark. A disadvantage of using such additives is a reduction in visible transmission, increased haze and large color shifts due to the inherent residual color or particulate nature of the additives.

A photochemical interaction between the substrate and the laser light is another reaction mechanism by which identifiers are transferred to thermoplastics compositions. Lower wavelength light lasers such as those at 532 nm and especially with wavelengths lower than 400 nm (e.g., ultraviolet) generate contrast in polymer compositions in such a manner. The process is often referred to as "cold marking" due to the perception that there is limited thermal effect from the interaction of the lasers with the thermoplastic compositions. Ultraviolet lasers are predominantly used to mark opaque thermoplastic compositions containing titanium dioxide and yield a dark mark on white or light colored substrates.

However, there are some problems associated with the above processes. For example, the laser is not restricted to interacting at the surface or upper portion of the substrate to be marked and the intense light from the laser easily passes through the outer part or layer. In most cases, it is desirable that the mark is confined to the surface or close to the surface and that the laser beam does not interact or damage other materials or components beneath the layer or part to be inscribed. Exemplary designs or structures wherein the material to be marked houses devices or overlays other materials include a two shot or over-molded part such as in automotive glazing, a thermoplastic screen or housing encasing electronic devices such as mobile phones. One option is the addition of either IR absorbing additives or scattering additives, such as titanium dioxide, to the outer material, which restricts the transparency, haze, and colors available. Another problem is that an overt white or light colored mark is either impossible or the mark is a dark brown to tan color due to the persistent contribution from the carbonization effect and more particularly, in transparent compositions where a black mark is achieved due to strong carbonization of the material. Also, the durability of light colored marks is poor as the voids that cause the swelling are easily compressed and it is extremely difficult to achieve a semi-covert (i.e., barely visible) watermark, particularly in transparent compositions.

Another challenge exists when the material to be inscribed also functions as the laser transparent component in an article to be assembled by laser transmission welding (LTW). In general the lasers used for LTW are based on wavelengths longer than 800 nm. In order to join two components by LTW one component needs to be essentially laser transparent (e.g., no absorption), while the second component needs to absorb the laser light. The laser light then passes through the first component and heat is generated at the interface through the absorption of the laser light in the second component. The heat is conducted to the first layer, which melts and a weld is created upon re-solidification of both components. However, in some cases it is desired that the first component, which is transparent to laser light longer than 800 nm, also be inscribed with data. Even more desirable is the ability to inscribe a transparent, colored, opaque or dark colored first component suitable for LTW with a light mark. Thus, there is a need for the ability to generate a light colored mark on thermoplastic compositions.

It can also be desirable to be able to generate a range of contrast levels from an easily readable (e.g., light colored) mark to a semi-covert, barely visible, inscription with as little increase to the profile topography as possible, in order to eliminate the possibility of the layers lifting, separating, and/or cracking, for example when a laser inscription or mark is generated at the interface of two layers or at the interface of a thermoplastic layer and a coating. The change in the profile topography via carbonization, to form a dark mark or, alternatively, a swelling from a foaming process, can give profiles much larger than 50 micrometers and even larger than 100 micrometers. The generation of UV active or colored text, logos, barcodes or images, which are often incorporated into EID ("Electronic Identification") cards passports, and pharmaceutical packaging requires the application of specialized inks and printing procedures. However, the specialized inks and printing procedures are costly and time consuming. Thus, a need exists to provide thermoplastic compositions with a customizable, machine-readable security function using a laser to generate microdots that exhibit either a different color under ultra-violet (UV) light source or are visibly of different color to the background.

SUMMARY

In one embodiment, an article for laser marking can comprising: a thermoplastic composition comprising a thermoplastic polymer, an active component comprising at least one of a polymeric unit and an additive, wherein the thermoplastic polymer has a visible transmission of greater than or equal to 80% according to ASTM D1003-00, Procedure A, using D65 illumination, 10 degrees observer, and thickness of 1 mm; and a mark produced by chemical rearrangement of the active component generated by a laser of a first wavelength; wherein the mark exhibits at least one of: (i) a change in optical properties in the region 400 nm to 700 nm when exposed to light having a wavelength less than or equal to 500 nm; and (ii) a change in optical properties in the region of 400 nm to 700 nm when exposed to light having a wavelength greater than or equal to the first wavelength.

A multilayered article for laser marking comprising: a first layer having a visible transmission of greater than or equal to 80% according to ASTM D1003-00, Procedure A, using D65 illumination, 10 degrees observer, at a thickness of the first layer in the multilayer article; a second layer having a visible transmission of greater than or equal to 80% according to ASTM D1003-00, Procedure A, using D65 illumination, 10 degrees observer, at a thickness of the second layer in the multilayer article, and wherein the second layer comprises an active component that will form a laser mark with an L* of less than or equal to 40 as measured according to CIELAB 1976 (specular included), when exposed to a laser light of a wavelength of greater than 800 nm; a third layer reflective to laser light having a wavelength greater than 800 nm, wherein the third layer has a visible transmission of greater than or equal to 80% according to ASTM D1003-00, Procedure A, using D65 illumination, 10 degrees observer, at a thickness of the third layer in the multilayer article; and optionally a substrate; wherein the article comprises a laser mark having an L* of less than or equal to 40 as measured according to CIELAB 1976 (specular included).

A multilayered article for laser marking comprising: a first layer having a visible transmission of greater than or equal to 80% according to ASTM D1003-00, Procedure A, using D65 illumination, 10 degrees observer, at a thickness of the first layer in the multilayer article; a second layer having a visible transmission of greater than or equal to 80% according to ASTM D1003-00, Procedure A, using D65 illumination, 10 degrees observer, at a thickness of the second layer in the multilayer article, and wherein the second layer comprises an active component that will form a laser mark with an L* of less than or equal to 40 as measured according to CIELAB 1976 (specular included), when exposed to a laser light of a wavelength of greater than 800 nm; and a non-white substrate.

In another embodiment, a multilayered article, comprises: a first layer having a visible transmission of greater than or equal to 80% according to ASTM D1003-00, Procedure A, using D65 illumination, 10 degrees observer, at a thickness of the first layer in the multilayer article; and a second layer, active to laser light having a wavelength less than or equal to 500 nm, wherein the second layer is active via an active component that will form a laser mark with an L* of less than or equal to 40 when exposed to a laser light of a wavelength of less than or equal to 500 nm; wherein the article comprises a laser mark having a mark L* less than or equal to 40, as measured according to CIELAB 1976 (specular included).

Further details and features of the present article and method are set forth below.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

DETAILED DESCRIPTION

Figure 1:
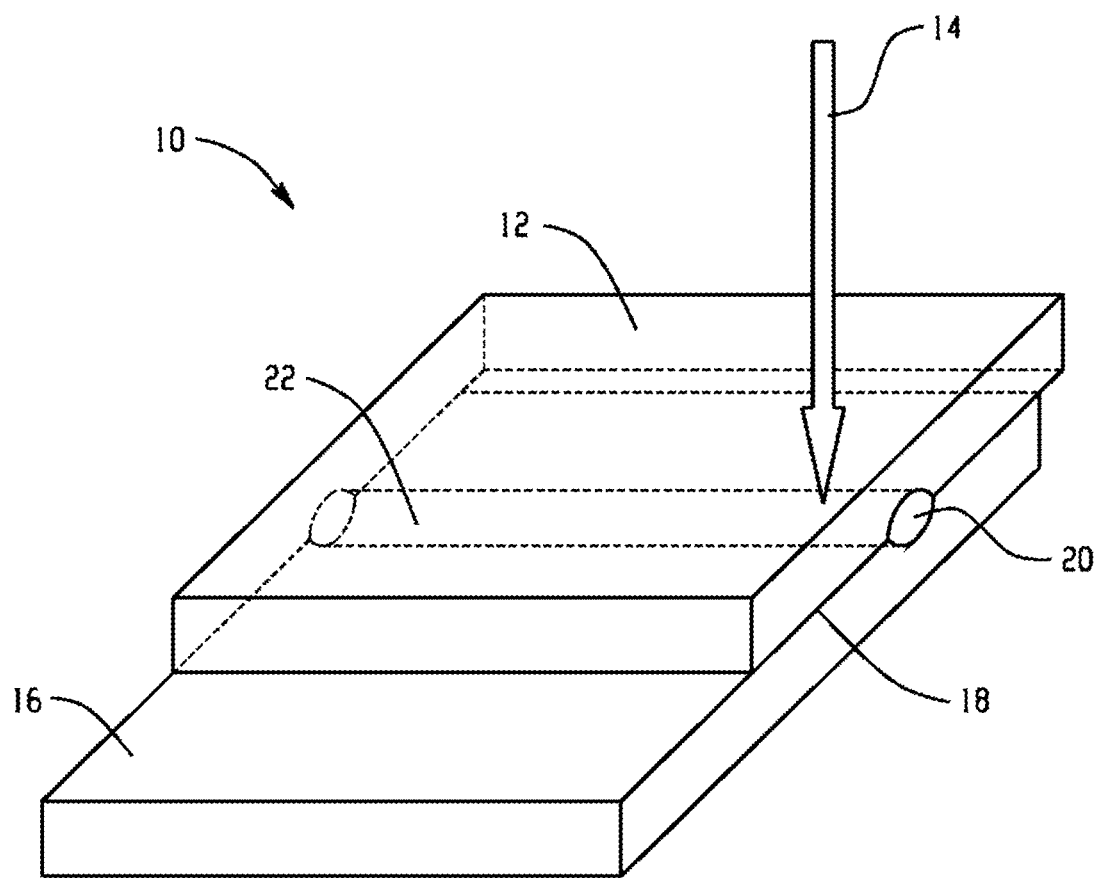
FIG. 1 is a schematic view of the laser welding process disclosed herein illustrating the laser marking options and positions.

Disclosed herein is a process that can inscribe transparent, opaque, and/or colored thermoplastic compositions having low visible reflectivity with microdots that can be arranged to form customizable, and, optionally, machine-readable light colored text, logos, barcodes, and images using a laser beam to generate microdots. As used herein, a microdot is a single interaction site, which can be arranged to generate marks, logos, text, etc. of different optical properties (e.g., reflectivity) to the background wherein the mark can be clearly visible (e.g., identifiable by the human eye without magnification) to semi-covert (e.g., barely visible to the human eye). Laser beam and laser light are used interchangeably herein. It is to be understood that by laser beam as used herein does not refer to only a narrow projection of light, but also refers to and encompasses a broad array of light. A colorant can be added to a natural, uncolored material (e.g., neat resin) without changing the reflectivity. As described herein, a process or method has been developed to generate a light colored mark on transparent thermoplastic compositions, including compositions comprising polymers such as polycarbonate, bisphenol-A polycarbonate based copolymers, polyesters, polymethyl methacrylate (PMMA), polystyrene, polybutylene terephthalate, polyolefins, polyamides, polyvinylchloride, polylactic acid, and combinations comprising at least one of the foregoing, at or below the surface of an article, using laser beams having a wavelength less than or equal to 1000 nm. Some polymers can produce such an effect but the method described herein can provide a method to generate compositions that can enhance the process of generating a laser mark or even make it possible to generate a laser mark in compositions where a laser light cannot typically generate a mark. Table 1 provides an overview of laser types and the mechanisms by which they mark a thermoplastic substrate.

TABLE 1

Laser Information

| Laser | Laser/Substrate Interaction | Wavelength | Reaction |
|---|---|---|---|
| $CO_2$ | Engraving of metals/polymers | 10,640 nm | Heat induced |
| IR (red) | Carbonization and foaming of polymers<br>Ablation of thin layers (lacquer or film) | 1,064 nm | Heat induced |
| Green | Carbonization and foaming of polymers<br>Ablation of thin layers (lacquer or film)<br>Cutting of foils | 532 nm | Heat induced and Photo-chemistry |
| UV | "Cold marking" without thermal interaction | 355 nm | Photochemistry |
| Excimer | "Cold marking" without thermal interaction | 170 nm to 351 nm | Photochemistry |

An additive, e.g., an absorbing additive such as an ultraviolet absorbing additive and/or colorant can be added to a composition, e.g., a transparent thermoplastic such as polycarbonate, bisphenol-A based polycarbonate copolymers, polyesters, PMMA, polystyrene, polybutylene terephthalate, polyolefins, polyamide, polyvinylchloride, polylactic acid, and combinations comprising at least one of the foregoing The additive can allow for the use of laser beams with a wavelength less than or equal to 2,000 nm, specifically, less than or equal to 1000 nm, and even more specifically, less than or equal to 500 nm to interact with the substrate and alter the reflectivity to produce a light colored mark via a thermal mechanism.

The compositions and methods described herein can allow light colored text, logos, and/or other identifiers to be inscribed or marked on or close to the surface of thermoplastic compositions (e.g., transparent thermoplastic compositions) at wavelengths of about 200 nm to 700 nm, specifically, 200 nm to 500 nm. For example, a white colored mark can be inscribed on a transparent material. As described herein, light colored can mean a white mark, where white can generally be described as white, off white, bright white ivory, snow, pearl, antique white, chalk, milk white, lily, smoke, seashell, old lace, cream, linen, ghost white, beige, cornsilk, alabaster, paper, whitewash, etc. The intensity and color of the mark can be modulated by varying laser parameters such as power, frequency, speed, line spacing, and focus, which allows marks of varying degrees of legibility or clarity to be generated. The legibility of the laser mark, whether on or close to the surface of the substrate, can be modulated from an easily readable light colored mark to a semi-covert, barely visible inscription, which may require specialized and sophisticated viewing devices to read and interpret the data. The resulting watermark or ghost mark can be used as a semi-covert method of identification and/or traceability for material or product identification. A watermark can generally be described as a recognizable image that appears when viewed by transmitted light (or when viewed by reflected light, atop a dark background) at specific angles. Watermarks can vary greatly in their visibility; while some are obvious on casual inspection, others require some study to observe.

Figure 7:
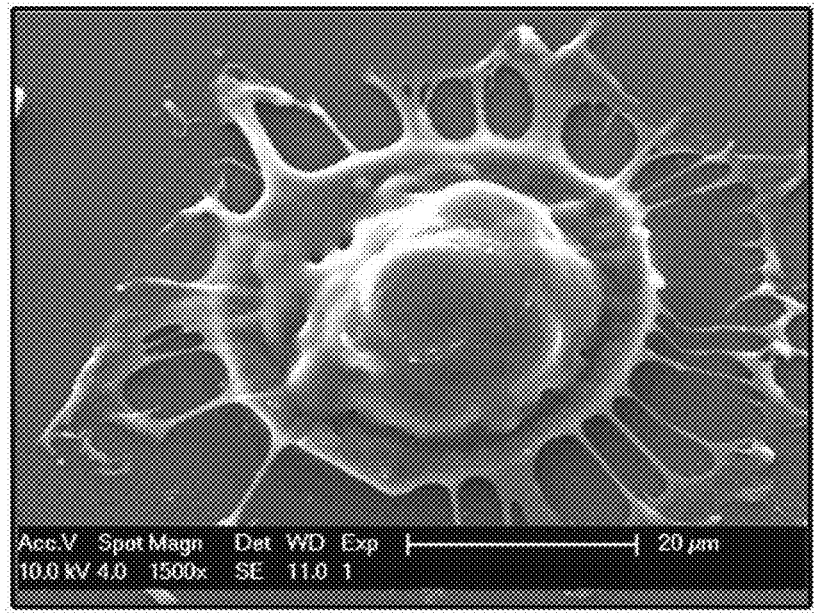
FIG. 7 is a scanning electron microscopic image of the marked square in the lower left hand corner of the matrix of Sample 22 as illustrated in FIG. 5.
Figure 8:
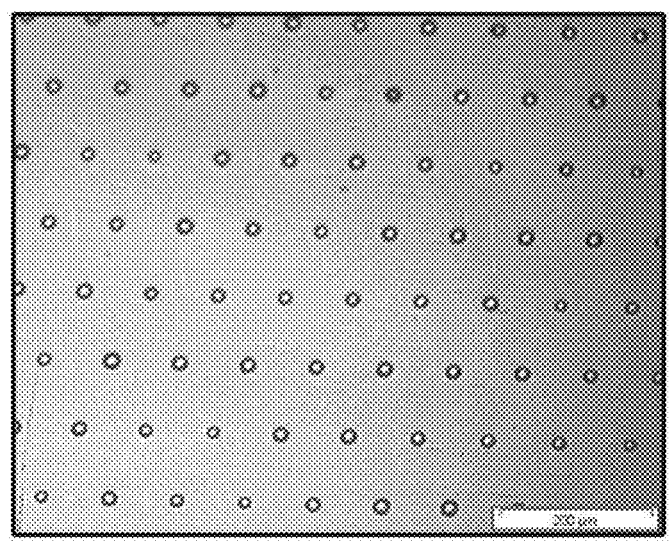
FIG. 8 is an optical image in transmission mode illustrating laser inscribed dots.

Without wishing to be bound by theory, it is believed that the treatment of the disclosed compositions with laser light having a wavelength less than or equal to 500 nm can produce a thermal interaction. In other words, the inscription can be a result of localized melting to generate an extremely small optically different, reflective or light scattering dot or array of dots. This is illustrated in FIG. 7, which shows a scanning electron microscopic (SEM) image of the bottom left square illustrated by reference number 30 in FIG. 5. The image in FIG. 7 illustrates that a UV laser induced thermal process can occur (i.e., melting at the surface). The composition and the laser process can control the light scattering effect of the individual dots or array of dots. Hence, the durability of the mark can therefore be as "tough" or durable as the substrate itself (e.g., cannot be scratched off).

The surprising thermal interaction between the disclosed compositions with laser light having a wavelength less than or equal to 500 nm can allow a laser light having a wavelength less than or equal to 500 nm to be used to join or weld two different components (e.g., a first component and a substrate) comprised of thermoplastic compositions such as polycarbonate, bisphenol-A based polycarbonate copolymers, polyesters, PMMA, polystyrene, polybutylene terephthalate, polyolefins, polyamides, polyvinylchloride, polylactic acid, and combinations comprising at least one of the foregoing. The components have different levels of absorption, transparency, and interaction to the laser beam having a wavelength less than or equal to 500 nm, such that the laser beam can pass through the first component without interaction and can then be absorbed by the second component to generate heat at the interface. The heat can then be conducted to the first layer, which melts, and a weld can be created upon resolidification of the components.

Further herein disclosed are articles that can comprise a first component comprising a first composition, and a second component (e.g., substrate) comprising a second composition where the first composition can comprise a polymer having little to no near infrared absorption at wavelengths greater than 800 nm to allow sufficient thermal build-up at the interface between the two components, which can allow the first component to be welded to the second component with a laser beam (e.g., laser light) having a wavelength longer than 800 nm. Such polymers include, but are not limited to non-scattering polymers such as polycarbonate, bisphenol-A based polycarbonate copolymers, polyesters, PMMA, polystyrene, and polyamides, and non-absorbing scattering crystalline or semi-crystalline polymers such as polybutylene terephthalate (PBT), polyethylene terephthalate (PET), polyolefins (e.g., high/low density polyethylene (H/LDPE), polypropylene (PP), etc.), and combinations comprising at least one of the foregoing. Having little to no infrared absorption at wavelengths greater than 800 nm can allow the first component to be attached (e.g., laser welded)

to the substrate comprising a second composition that absorbs light at wavelengths greater than 800 nm and can be joined to the first component by a laser beam having light at wavelengths greater than 800 nm. The first composition can be visibly transparent, colored, and/or opaque, using non-infrared absorbing colorants or additives and can be capable of being inscribed with laser light at wavelengths less than 800 nm, specifically, less than 500 nm. Such a feature can be beneficial in applications where the first component is the viewed and authenticated component. Likewise, the substrate can be visibly transparent, colored, opaque, and/or un-pigmented (i.e., not colored).

The inscription (i.e., laser marking) can be located on the surface of the first component and/or the substrate. In processes such as two shot molding, over-molding, or a laser welded set-up, the inscription can be located within the first component (e.g., in the first shot) with no interaction with the substrate material or other components housed by the disclosed compositions. Not to be limited by theory, it is believed that the inscriptions disclosed herein are a result of near surface modification, rather than a through surface modification as is the case with carbonized marks or the result of foaming, which increases the void volume of the material. It is believed that the methods disclosed herein can generate a mark (i.e., inscription) without increasing the void volume of the material.

The inscription can also occur at the interface of two components (e.g., two layers), wherein the first component does not interact with the laser beam and the second component interacts with the laser beam to alter the optical properties (e.g., reflectivity) of the second component at the point of interaction, where the laser beam has a wavelength of less than or equal to 2,000 nm, specifically, less than or equal to 1,000 nm, and even more specifically, less than or equal to 500 nm. In either case, the inscription can be durable (i.e., cannot be scratched off the surface). The appearance of the inscription can change when viewed from either side of the material. For example, with a neat resin (i.e., no colorant), with all other parameters the same, similar results can be obtained from both sides of the article (i.e., front and back), meaning that the reflectivities are close to one another. The use of electromagnetic radiation to create a visibly perceivable laser inscribed contrast on a polymer material as described herein can range from clearly visible from poorly visible and/or visible under only specific lighting/viewing conditions (e.g., a watermark). The appearance of the contrast area can be manipulated by controlling the change in morphology of the polymeric material by changing the electromagnetic radiation variables.

Various articles comprising the inscriptions are described herein. The following description of articles is merely illustrative of articles that can be produced and inscribed using the methods disclosed herein and are not intended to limit the scope hereof. For example, the methods disclosed herein can be used to laser inscribe microdots exhibiting a variation in reflectivity compared to an unmarked substrate, at or below the surface of the substrate, with the microdots being arranged and modulated in intensity using the laser parameters to generate logos, texts, barcodes, and/or images (e.g., photographic images) in the following exemplified articles: glazing parts such as automotive panels and lamp bezels in which the mark, including a watermark, can be introduced on the surface of the part, pre- or post-coating and can also be placed over second shot areas to increase contrast; pharmaceutical or food packaging marks, including watermarks; electronic housings or screens in phones, computers, tablets, televisions, etc., where the mark, including a watermark, is on the surface or at the interface of two components, for example, where the first component comprises PMMA and the second component comprises polycarbonate; mark, including a watermark, on eyewear lenses and frames; an article with an image, including a photographic image, which is visible in positive or negative depending on whether the observer is viewing the image in transmission or reflection; contact recognition or Braille inscriptions; and marks, including a watermark, on the surface or subsurface at the interface of two layers within cards or tickets such as business cards, identification (ID) cards, customer cards, etc. The mark can be generated on the surface or at the interface of two layers (e.g., two components) wherein the entire card is transparent or exists as a window in an opaque card. Other possible layers in the ID card can include a metallic layer, a magnetic layer, a layer with angular metamerism properties, and combinations comprising at least one of the foregoing. The layers can be assembled via various processes including, but not limited to co-extrusion, co-lamination, etc.

More specifically, ID cards can, for example, comprise a core layer (e.g., reflective thermoplastic layer), and a transparent film layer comprising the compositions disclosed herein (e.g., either a material having the capability of absorbing light at wavelengths less than or equal to 500 nm or a material comprising a light absorbing additive having the capability of absorbing light at wavelengths less than or equal to 500 nm). Optionally, a cap layer can be disposed on a side of the transparent film layer opposite the core layer, e.g., to protect against scratches, provide added chemical resistance, and/or light resistance. Other layers having a thickness of less than or equal to 100 micrometers can be formed first by an extrusion, a melt casting, or solvent casting process, and optionally, stretched to reach the desired thickness. The cap layers, and other, optional layer (s) can be added (e.g., in the form of a coating that can be cured by an energy source such as an ultra violet lamp).

FIG. 1 illustrates a schematic of the process used to laser weld two components and form an article 10. In FIG. 1, laser exposure 14 (e.g., a laser beam) is directed through the first component 12 (e.g., a transparent polymer) to a second component 16 (e.g., a substrate that is laser absorbing), where laser exposure 14 is absorbed, resulting in the formation of heat at the interface 18 of the two layers. The heating generates a local melt pool 20 between the layers resulting in a weld of the first thermoplastic component 12 to the second laser weldable component 16. The laser exposure 14 generally follows a linear path of overlapping spot exposures to produce a welded seam 22. The second component 16 can additionally comprise an absorbing additive to enhance absorption of light from the laser beam.

Possible thermoplastic resins that may be employed include, but are not limited to, oligomers, polymers, ionomers, dendrimers, copolymers such as graft copolymers, block copolymers (e.g., star block copolymers, random copolymers, etc.) and combinations comprising at least one of the foregoing. Examples of such thermoplastic resins include, but are not limited to, polycarbonates (e.g., blends of polycarbonate (such as, polycarbonate-polybutadiene blends, copolyester polycarbonates)), polystyrenes (e.g., copolymers of polycarbonate and styrene, polyphenylene ether-polystyrene blends), polyimides (e.g., polyetherimides), acrylonitrile-styrene-butadiene (ABS), polyalkylmethacrylates (e.g., polymethylmethacrylates (PMMA)), polyesters (e.g., copolyesters, polythioesters), polyolefins (e.g., polypropylenes (PP) and polyethylenes, high density polyethylenes (HDPE), low density polyethylenes (LDPE), linear low density polyethylenes (LLDPE)), polyamides (e.g., polyamideimides), polyarylates, polysulfones (e.g., polyarylsulfones, polysulfonamides), polyphenylene sulfides, polytetrafluoroethylenes, polyethers (e.g., polyether ketones (PEK), polyether etherketones (PEEK), polyethersulfones (PES)), polyacrylics, polyacetals, polybenzoxazoles (e.g., polybenzothiazinophenothiazines, polybenzothiazoles), polyoxadiazoles, polypyrazinoquinoxalines, polypyromellitimides, polyquinoxalines, polybenzimidazoles, polyoxindoles, polyoxoisoindolines (e.g., polydioxoisoindolines), polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyls (e.g., polyvinyl ethers, polyvinyl thioethers, polyvinyl alcohols, polyvinyl ketones, polyvinyl halides, polyvinyl nitriles, polyvinyl esters, polyvinylchlorides), polybutylene terephthalate (PBT), polysulfonates, polysulfides, polyureas, polyphosphazenes, polysilazzanes, polysiloxanes, fluoropolymers (e.g., polyvinyl fluoride (PVF), polyvinylidene fluoride (PVDF), polyvinyl fluoride (PVF), fluorinated ethylene-propylene (FEP), polyethylenetetrafluoroethylene (ETFE)) and combinations comprising at least one of the foregoing.

More particularly, the thermoplastic resin can include, but is not limited to, polycarbonate resins (e.g., Lexan™ resins, commercially available from SABIC Innovative Plastics), polyphenylene ether-polystyrene resins (e.g., Noryl™ resins, commercially available from SABIC Innovative Plastics), polyetherimide resins (e.g., Ultem™ resins, commercially available from SABIC Innovative Plastics), polybutylene terephthalate and/or polyethylene terephthalate resins (e.g., Valox™ resins, commercially available from SABIC Innovative Plastics), polybutylene terephthalate-polycarbonate resins (e.g., Xenoy™ resins, commercially available from SABIC Innovative Plastics), copolyestercarbonate resins (e.g. Lexan™ SLX resins, commercially available from SABIC Innovative Plastics), and combinations comprising at least one of the foregoing resins. Even more particularly, the thermoplastic resins can include, but are not limited to, homopolymers and copolymers of a polycarbonate, a polyester, a polyacrylate, a polyamide, a polyetherimide, a polyphenylene ether, or a combination comprising at least one of the foregoing resins. The polycarbonate can comprise copolymers of polycarbonate (e.g., polycarbonate-polysiloxane, such as polycarbonate-polysiloxane block copolymer), linear polycarbonate, branched polycarbonate, end-capped polycarbonate (e.g., nitrile end-capped polycarbonate), and combinations comprising at least one of the foregoing, for example, a combination of branched and linear polycarbonate.

As used herein, the term "polycarbonate" means compositions having repeating structural carbonate units of formula (1)

(1)

in which at least 60 percent of the total number of $R^1$ groups contain aromatic moieties and the balance thereof are aliphatic, alicyclic, or aromatic. In an embodiment, each $R^1$ is a $C_{6-30}$ aromatic group, that is, contains at least one aromatic moiety. $R^1$ can be derived from a dihydroxy compound of the formula HO—$R^1$—OH, in particular of formula (2)

HO-$A^1$-$Y^1$-$A^2$-OH (2)

wherein each of $A^1$ and $A^2$ is a monocyclic divalent aromatic group and $Y^1$ is a single bond or a bridging group having one or more atoms that separate $A^1$ from $A^2$. In an exemplary embodiment, one atom separates $A^1$ from $A^2$. Specifically, each $R^1$ can be derived from a dihydroxy aromatic compound of formula (3)

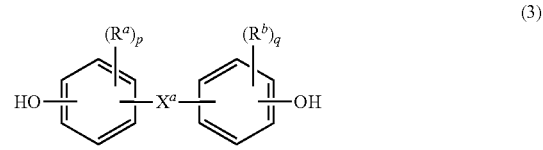

(3)

wherein $R^a$ and $R^b$ each represent a halogen or $C_{1-12}$ alkyl group and can be the same or different; and p and q are each independently integers of 0 to 4. It will be understood that $R^a$ is hydrogen when p is 0, and likewise $R^b$ is hydrogen when q is 0. Also in formula (3), $X^a$ represents a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In one embodiment, p and q are each 1, and $R^a$ and $R^b$ are each a $C_{1-3}$ alkyl group, specifically methyl, disposed meta to the hydroxy group on each arylene group.

In an embodiment, $X^a$ is a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Exemplary groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. A specific example wherein $X^a$ is a substituted cycloalkylidene is the cyclohexylidene-bridged, alkyl-substituted bisphenol of formula (4)

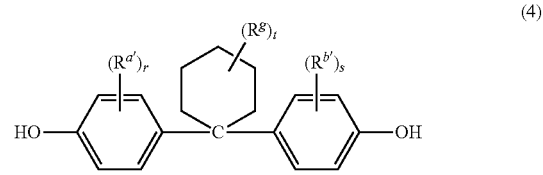

(4)

wherein $R^{a'}$ and $R^{b'}$ are each independently $C_{1-12}$ alkyl, $R^g$ is $C_{1-12}$ alkyl or halogen, r and s are each independently 1 to 4, and t is 0 to 10. In a specific embodiment, at least one of each of $R^{a'}$ and $R^{b'}$ are disposed meta to the cyclohexylidene bridging group. The substituents $R^{a'}$, $R^{b'}$, and $R^g$ can, when comprising an appropriate number of carbon atoms, be straight chain, cyclic, bicyclic, branched, saturated, or unsaturated. In an embodiment, $R^{a'}$ and $R^{b'}$ are each independently $C_{1-4}$ alkyl, $R^g$ is $C_{1-4}$ alkyl, r and s are each 1, and t is 0 to 5. In another specific embodiment, $R^{a'}$, $R^{b'}$ and $R^g$ are each methyl, r and s are each 1, and t is 0 or 3. The cyclohexylidene-bridged bisphenol can be the reaction product of two moles of o-cresol with one mole of cyclohexanone. In another exemplary embodiment, the cyclohexylidene-bridged bisphenol is the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures.

In another embodiment, $X^a$ is a $C_{1-18}$ alkylene group, a $C_{3-18}$ cycloalkylene group, a fused $C_{6-18}$ cycloalkylene group, or a group of the formula —$B^1$—W—$B^2$— wherein $B^1$ and $B^2$ are the same or different $C_{1-6}$ alkylene group and W is a $C_{3-12}$ cycloalkylidene group or a $C_{6-16}$ arylene group.

$X^a$ can also be a substituted $C_{3-18}$ cycloalkylidene of formula (5)

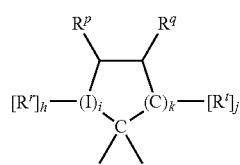

(5)

wherein $R^r$, $R^p$, $R^q$, and $R^t$ are independently hydrogen, halogen, oxygen, or $C_{1-12}$ organic groups; I is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (5) will have an unsaturated carbon-carbon linkage where the ring is fused. When k is one and i is 0, the ring as shown in formula (5) contains 4 carbon atoms, when k is 2, the ring as shown in formula (5) contains 5 carbon atoms, and when k is 3, the ring contains 6 carbon atoms. In one embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Other useful aromatic dihydroxy compounds of the formula HO—$R^1$—OH include compounds of formula (6)

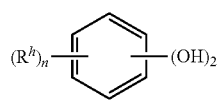

(6)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

A specific type of copolymer is a polyester carbonate, also known as a polyester-polycarbonate. Such copolymers further contain, in addition to recurring carbonate chain units of formula (1), repeating units of formula (A)

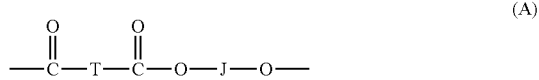

(A)

wherein J is a divalent group derived from a dihydroxy compound, and can be, for example, a $C_{2-10}$ alkylene, a $C_{6-20}$ cycloalkylene, a $C_{6-20}$ arylene, or a polyoxyalkylene in which the alkylene groups contain 2 to 6 carbon atoms, specifically 2, 3, or 4 carbon atoms; and T is a divalent group derived from a dicarboxylic acid, and can be, for example, a $C_{2-10}$ alkylene, a $C_{6-20}$ cycloalkylene, or a $C_{6-20}$ arylene. Copolyesters containing a combination of different T and/or J groups can be used. The polyesters can be branched or linear.

In an embodiment, J is a $C_{2-30}$ alkylene group having a straight chain, branched chain, or cyclic (including polycyclic) structure. In another embodiment, J is derived from a dihydroxy compound of formula (2) above. In another embodiment, J is derived from a bisphenol of formula (3) above. In another embodiment, J is derived from an aromatic dihydroxy compound of formula (6) above.

Aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination comprising at least one of the foregoing acids. Acids containing fused rings can also be present, such as in 1,4-, 1,5-, or 2,6-naphthalenedicarboxylic acids. Specific dicarboxylic acids include terephthalic acid, isophthalic acid, naphthalene dicarboxylic acid, cyclohexane dicarboxylic acid, or a combination comprising at least one of the foregoing acids. A specific dicarboxylic acid comprises a combination of isophthalic acid and terephthalic acid wherein the weight ratio of isophthalic acid to terephthalic acid is 91:9 to 2:98. In another specific embodiment, J is a $C_{2-6}$ alkylene and T is p-phenylene, m-phenylene, naphthalene, a divalent cycloaliphatic group, or a combination thereof. This class of polyester includes the poly(alkylene terephthalates).

The molar ratio of ester units to carbonate units in the copolymers can vary broadly, for example 1:99 to 99:1, specifically 10:90 to 90:10, more specifically 25:75 to 75:25, depending on the desired properties of the final composition.

In a specific embodiment, the polyester unit of a polyester-polycarbonate is derived from the reaction of a combination of isophthalic and terephthalic diacids (or derivatives thereof) with resorcinol. In another specific embodiment, the polyester unit of a polyester-polycarbonate is derived from the reaction of a combination of isophthalic acid and terephthalic acid with bisphenol A. In a specific embodiment, the polycarbonate units are derived from bisphenol A.

In another specific embodiment, the polycarbonate units are derived from resorcinol and bisphenol A in a molar ratio of resorcinol carbonate units to bisphenol A carbonate units of 1:99 to 99:1.

Polycarbonates and polyester-polycarbonate can be manufactured by processes such as interfacial polymerization and melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as, for example, a tertiary amine or a phase transfer catalyst, under controlled pH conditions, e.g., 8 to 10. The water immiscible solvent can be, for example, methylene chloride, 1,2-dichloroethane, chlorobenzene, toluene, and the like.

Exemplary carbonate precursors include a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an embodiment, an interfacial polymerization reaction to form carbonate linkages uses phosgene as a carbonate precursor, and is referred to as a phosgenation reaction. In the manufacture of polyester-polycarbonates by interfacial polymerization, rather than using the dicarboxylic acid or diol per se, the reactive derivatives of the acid or diol, such as the corresponding acid halides, in particular the acid dichlorides and the acid dibromides can be used. Thus, for example instead of using isophthalic acid, terephthalic acid, or a combination comprising at least one of the foregoing acids, isophthaloyl dichloride, terephthaloyl dichloride, or a combination comprising at least one of the foregoing dichlorides can be used.

Specific examples of bisphenol compounds of formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis(4-hydroxy-t-butylphenyl) propane, 3,3-bis(4-hydroxyphenyl) phthalimidine, 2-phenyl-3,3-bis(4-hydroxyphenyl) phthalimidine (p,p-PPPBP), and 1,1-bis(4-hydroxy-3-methylphenyl)cyclohexane (DMBPC). Combinations comprising at least one of the foregoing dihydroxy compounds can also be used. In one specific embodiment, the polycarbonate is a linear homopolymer derived from bisphenol A, in which each of $A^1$ and $A^2$ is p-phenylene and $Y^1$ is isopropylidene in formula (3).

The homopolymer of DMBPC carbonate, which is represented by the x portion of formula (7) or its copolymer with BPA carbonate has an overall chemical structure represented by formula (7).

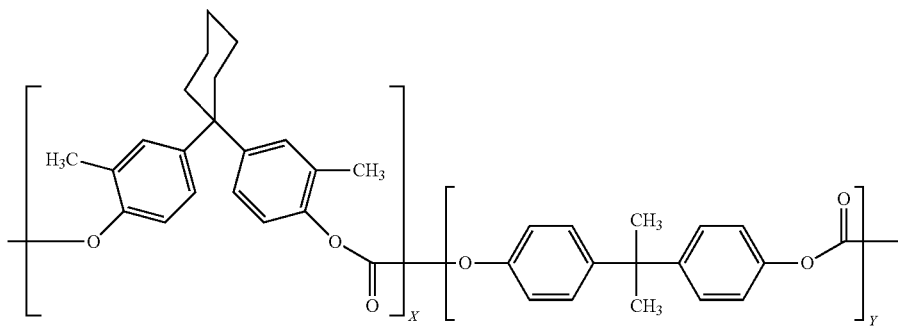

(7)

DMBPC carbonate can be co-polymerized with BPA carbonate to form a DMBPC BPA co-polycarbonate. For example, DMBPC based polycarbonate as a copolymer or homopolymer (DMBPC) can comprise 10 to 100 mol % DMBPC carbonate and 90 to 0 mol % BPA carbonate, specifically, 25 mol % DMBPC carbonate and 75 mol % BPA carbonate, more specifically, 50 mol % DMBPC carbonate and 50 mol % BPA carbonate.

The method of making any of the polycarbonates herein described is not particularly limited. It may be produced by any known method of producing polycarbonate including the interfacial process using phosgene and/or the melt process using a diaryl carbonate, such as diphenyl carbonate or bismethyl salicyl carbonate, as the carbonate source.

The polycarbonate can comprise a PPC polymer comprising a BPA carbonate block and an aromatic ester block (e.g., isophthalate and terephthalate) as shown in formula (8).

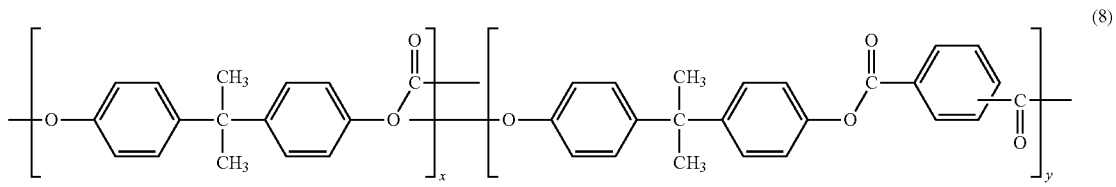

(8)

In an embodiment, the PPC polymer can comprise 10 mol % to 50 mol % BPA carbonate blocks and 50 mol % to 90 mol % aromatic ester blocks, specifically, 20 mol % BPA blocks and 80 mol % aromatic ester blocks, with an isophthalate to terephthalate ratio of 93:7.

A specific example of dihydroxy compounds of formula (2) can be the following formula (9)

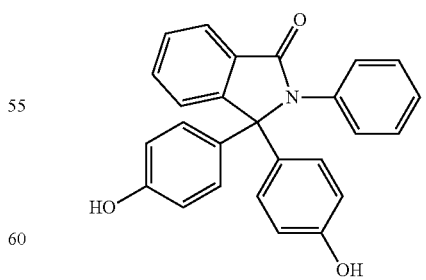

(9)

(also known as 3,3-bis(4-hydroxyphenyl)-2-phenylisoindolin-1-one (PPPBP)) also known as 2-phenyl-3,3-bis(4-hydroxyphenyl)phthalimidine.

The dihydroxy compounds of formula (2) can also be the following formula (10)

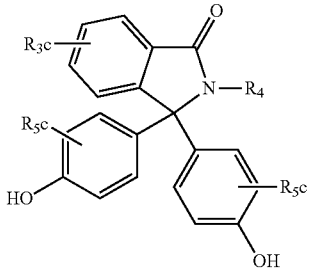

wherein $R_3$ and $R_5$ are each independently a halogen or a $C_{1-6}$ alkyl group, $R_4$ is a $C_{1-6}$ alkyl, phenyl, or phenyl substituted with up to five halogens or $C_{1-6}$ alkyl groups, and c is 0 to 4. In a specific embodiment, $R_4$ is a $C_{1-6}$ alkyl or phenyl group. In still another embodiment, $R_4$ is a methyl or phenyl group. In another specific embodiment, each c is 0.

The polycarbonate can comprise a copolymer of p,p-PPPBP carbonate as described with respect to formulas (9) and (10) and BPA carbonate, where the copolymer has the structure illustrated in formula (11).

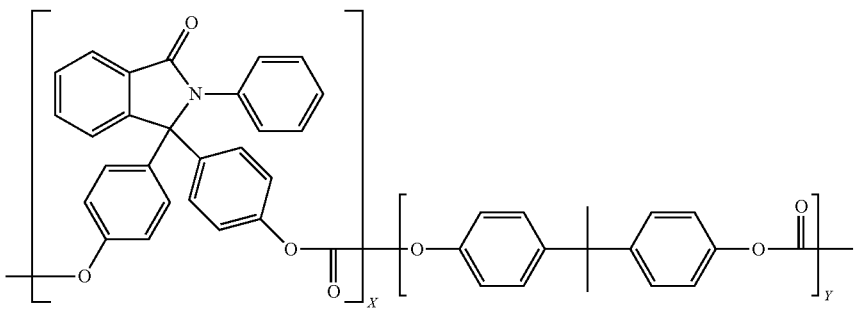

The copolymer of p,p-PPPBP carbonate and BPA carbonate can comprise 25 mol % to 75 mol % p,p-PPPBP carbonate and 75 mol % to 25 mol % BPA carbonate, specifically, 35 mol % p,p-PPPBP carbonate and 65 mol % BPA carbonate.

The composition further comprises a polysiloxane-polycarbonate copolymer, also referred to as a poly(siloxane-carbonate). The polydiorganosiloxane (also referred to herein as "polysiloxane") blocks of the copolymer comprise repeating diorganosiloxane units as in formula (10)

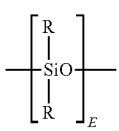

(10)

wherein each R is independently a $C_{1-13}$ monovalent organic group. For example, R can be a $C_1$-$C_{13}$ alkyl, $C_1$-$C_{13}$ alkoxy, $C_2$-$C_{13}$ alkenyl, $C_2$-$C_{13}$ alkenyloxy, $C_3$-$C_6$ cycloalkyl, $C_3$-$C_6$ cycloalkoxy, $C_6$-$C_{14}$ aryl, $C_6$-$C_{10}$ aryloxy, $C_7$-$C_{13}$ arylalkyl, $C_7$-$C_{13}$ aralkoxy, $C_7$-$C_{13}$ alkylaryl, or $C_7$-$C_{13}$ alkylaryloxy. The foregoing groups can be fully or partially halogenated with fluorine, chlorine, bromine, or iodine, or a combination thereof. In an embodiment, where a transparent polysiloxane-polycarbonate is desired, R is unsubstituted by halogen. Combinations of the foregoing R groups can be used in the same copolymer.

The value of E in formula (10) can vary widely depending on the type and relative amount of each component in the thermoplastic composition, the desired properties of the composition, and like considerations. Generally, E has an average value of 2 to 1,000, specifically 2 to 500, 2 to 200, or 2 to 125, 5 to 80, or 10 to 70. In an embodiment, E has an average value of 10 to 80 or 10 to 40, and in still another embodiment, E has an average value of 40 to 80, or 40 to 70. Where E is of a lower value, e.g., less than 40, it can be desirable to use a relatively larger amount of the polycarbonate-polysiloxane copolymer. Conversely, where E is of a higher value, e.g., greater than 40, a relatively lower amount of the polycarbonate-polysiloxane copolymer can be used.

A combination of a first and a second (or more) polycarbonate-polysiloxane copolymers can be used, wherein the average value of E of the first copolymer is less than the average value of E of the second copolymer.

In an embodiment, the polydiorganosiloxane blocks are of formula (11)

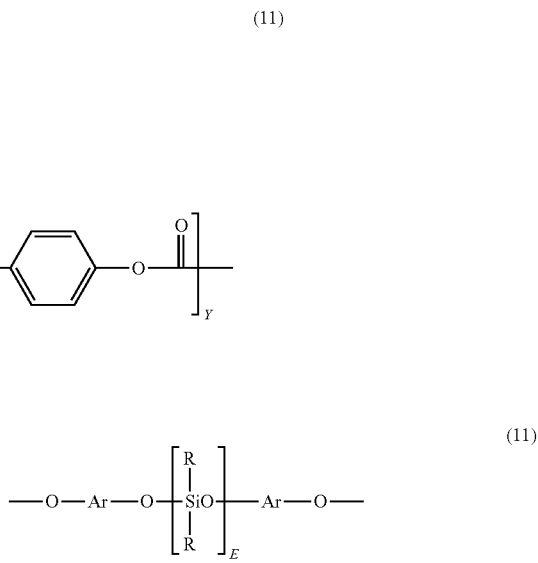

wherein E is as defined above; each R can be the same or different, and is as defined above; and Ar can be the same or different, and is a substituted or unsubstituted $C_6$-$C_{30}$ arylene, wherein the bonds are directly connected to an aromatic moiety. Ar groups in formula (11) can be derived from a $C_6$-$C_{30}$ dihydroxyarylene compound, for example a dihydroxyarylene compound of formula (3) or (6) above. dihydroxyarylene compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane. Combinations comprising at least one of the foregoing dihydroxy compounds can also be used.

In another embodiment, polydiorganosiloxane blocks are of formula (13)

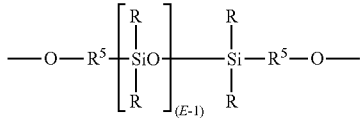

(13)

wherein R and E are as described above, and each $R^5$ is independently a divalent $C_1$-$C_{30}$ organic group, and wherein the polymerized polysiloxane unit is the reaction residue of its corresponding dihydroxy compound. In a specific embodiment, the polydiorganosiloxane blocks are of formula (14):

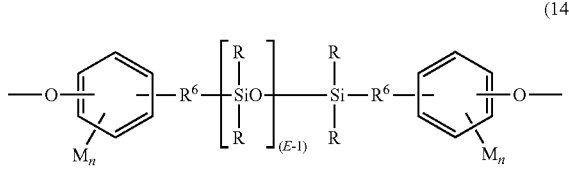

(14)

wherein R and E are as defined above. $R^6$ in formula (14) is a divalent $C_2$-$C_8$ aliphatic. Each M in formula (14) can be the same or different, and can be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4. In an embodiment, M is bromo or chloro, an alkyl such as methyl, ethyl, or propyl, an alkoxy such as methoxy, ethoxy, or propoxy, or an aryl such as phenyl, chlorophenyl, or tolyl; $R^6$ is a dimethylene, trimethylene or tetramethylene; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, R is methyl, M is methoxy, n is one, $R^6$ is a divalent $C_1$-$C_3$ aliphatic group. Specific polydiorganosiloxane blocks are of the formula

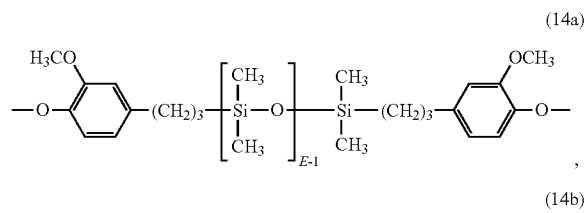

(14a)

(14b)

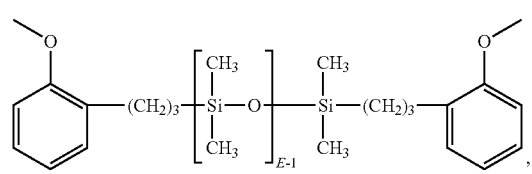

(14c)

or a combination comprising at least one of the foregoing, wherein E has an average value of 2 to 200, 2 to 125, 5 to 125, 5 to 100, 5 to 50, 20 to 80, or 5 to 20.

Transparent polysiloxane-polycarbonate copolymers comprise carbonate units (1) derived from bisphenol A, and repeating siloxane units (14a), (14b), (14c), or a combination comprising at least one of the foregoing (specifically of formula 14a), wherein E has an average value of 4 to 50, 4 to 15, specifically 5 to 15, more specifically 6 to 15, and still more specifically 7 to 10. The transparent copolymers can be manufactured using one or both of the tube reactor processes described in U.S. Patent Application No. 2004/0039145A1 or the process described in U.S. Pat. No. 6,723,864 may be used to synthesize the poly(siloxane-carbonate) copolymers.

Blocks of formula (14) can be derived from the corresponding dihydroxy polydiorganosiloxane (15)

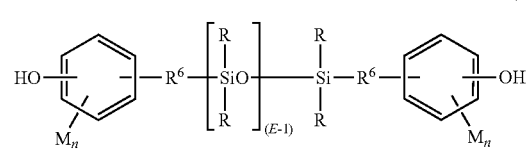

(15)

wherein R, E, M, $R^6$, and n are as described above. Such dihydroxy polysiloxanes can be made by effecting a platinum-catalyzed addition between a siloxane hydride of formula (16)

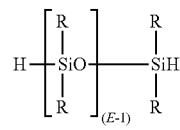

(16)

wherein R and E are as previously defined, and an aliphatically unsaturated monohydric phenol. aliphatically unsaturated monohydric phenols include eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Combinations comprising at least one of the foregoing can also be used. The polysiloxane-polycarbonate copolymers can then be manufactured, for example, by the methods described in U.S. Pat. No. 6,072,011 to Hoover.

The polyorganosiloxane-polycarbonate can comprise 50 to 99 weight percent of carbonate units and 1 to 50 weight percent siloxane units. Within this range, the polyorganosiloxane-polycarbonate copolymer can comprise 70 to 98 weight percent, more specifically 75 to 97 weight percent of carbonate units and 2 to 30 weight percent, more specifically 3 to 25 weight percent siloxane units.

Polyorganosiloxane-polycarbonates can have a weight average molecular weight of 2,000 to 100,000 Daltons, specifically 5,000 to 50,000 Daltons as measured by gel permeation chromatography using a crosslinked styrene-divinyl benzene column, at a sample concentration of 1 milligram per milliliter, and as calibrated with polycarbonate standards.

The polyorganosiloxane-polycarbonate can have a melt volume flow rate, measured at 300° C./1.2 kg, of 1 to 50 cubic centimeters per 10 minutes (cc/10 min), specifically 2 to 30 cc/10 min. Mixtures of polyorganosiloxane-polycarbonates of different flow properties can be used to achieve the overall desired flow property.

The compositions can include various additives ordinarily incorporated into polymer compositions of this type, with the proviso that the additive(s) are selected so as to not significantly adversely affect the desired properties of the composition. Such additives can be mixed at a suitable time during the mixing of the composition. Exemplary additives include impact modifiers, fillers, reinforcing agents, antioxidants, heat stabilizers, light stabilizers, ultraviolet (UV) light stabilizers, plasticizers, lubricants, mold release agents, antistatic agents, colorants (such as carbon black and organic dyes), surface effect additives, radiation stabilizers (e.g., infrared absorbing), flame retardants, and anti-drip agents. A combination of additives can be used, for example a combination of a heat stabilizer, mold release agent, and ultraviolet light stabilizer. In general, the additives are used in the amounts generally known to be effective. The total amount of additives (other than any impact modifier, filler, or reinforcing agents) is generally 0.001 wt. % to 5 wt. %, based on the total weight of the composition.

Absorbing additives such as light stabilizers and/or ultraviolet light (UV) absorbing stabilizers can also be used. Exemplary light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or combinations comprising at least one of the foregoing light stabilizers. Light stabilizers are used in amounts of 0.001 to 5 parts by weight, based on 100 parts by weight of the total composition, excluding any filler.

Exemplary UV absorbing additives include hydroxybenzophenones; hydroxybenzotriazoles; hydroxybenzotriazines; cyanoacrylates; oxanilides; benzoxazinones benzylidene malonates; hindered amine light stabilizers; nanoscale inorganics such as nickel quenchers, metal oxides, mixed metal oxides, metal borides; and combinations comprising at least one of the foregoing; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than or equal to 100 nanometers, or combinations comprising at least one of the foregoing UV absorbers. UV absorbers are used in amounts of 0.001 to 5 parts by weight, based on 100 parts by weight of the total composition, excluding any filler. Inorganic additives such as lanthanum hexaboride ($LaB_6$) or Cesium tungsten oxide (CTO) can also be used to enhance the interaction of compositions with laser light and improve mark contrasts.

Colorants such as pigment and/or dye additives can also be present alone or in combination with UV absorbing stabilizers having little residual visible coloration in order to modulate the substrate color as well as the color and contrast of the laser inscribed text, logos, barcodes, images, etc. by directly contributing to the change of reflectivity. Useful pigments can include, organic pigments such as azos, diazos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments.

Exemplary dyes are generally organic materials and include coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bisbenzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. It is to be understood that any of the above described additives, UV absorbers, colorants, etc. can be used with any of the materials described herein and is not limited to polycarbonate.

Further described herein is a process to achieve customizable, UV laser inscribed microdots that fluoresce under UV light and/or can be visibly colored. In other words, the laser inscribed dots (e.g., that can be assembled into, for example, text, logos, barcodes, images, and so forth) fluoresce when illuminated with UV light. Optionally, these dots can be different in color from the background. The compositions and processes allow the laser to inscribe data in various degrees of legibility including a covert or at least semi-covert format (e.g., barely visible to the unaided eye having normal vision). The UV laser inscribed microdots can be formed on a transparent thermoplastic (e.g., Tvis>80%) composition comprising an additive or polymeric unit incorporating units based on Formula 1, disclosed above. Without being bound by any particular theory, it is believed that the degree of legibility can be achieved by causing a photo-chemical rearrangement of an additive or polymer (backbone, side-chain or end-cap) within the composition wherein the visibility of the laser treated area becomes more pronounced when viewed under UV light. The chemical rearrangement can result in a change in the absorption of visible light that results in a color change. In the alternative, the chemical rearrangement can result in a change in the reflectivity of visible light. The laser treated area can additionally exhibit very subtle physical differences, which accounts for the visible differentiation of the laser treated area to the untreated parts. Thus, the use of UV active printing inks and printing processes can be avoided. In addition, due to the nature of the UV active and/or colored laser inscribed microdots, formed as the result of chemical re-arrangement, a thermoplastic substrate comprising the dots can advantageously be laminated (e.g., heat treated) without diminishing or losing the fluorescence or colored laser inscribed image. In contrast, white marks generated by the heat of a UV laser, formed as a result of physical change, can be damaged or destroyed through the heat associated with a lamination process.

The laser treated microdot can have a different refractive index than the untreated area due to the photo-chemical rearrangement of an additive or polymer (backbone, side-chain or end-cap) within the composition Laser inscribed microdots at or below the surface of thermoplastic compositions or substrates can be generated using lasers having a wavelength shorter than 1000 nm, specifically at wavelengths shorter than 800 nm, and more specifically shorter than 500 nm. The laser inscribed microdots can individually have dimensions of less than 200 micrometers. Specifically, the laser inscribed microdots can have dimensions of less than 100 micrometers. More specifically, the laser inscribed microdots can have dimensions less than 50 micrometers. The thermoplastic compositions include those set forth above and can also comprise an absorbing additive or colorant, in particular an ultraviolet absorbing additive or colorant, into or onto a transparent thermoplastic, such as polycarbonate (e.g., with moieties of aryl ester and/or diaryl carbonate) and/or BPA based co-polymer.

The visibility or legibility of the microdot arrangements under visible light can be tuned from clearly legible to semi-covert by modulating the level of interaction and hence the degree of scattering by the physical size/shape of the resulting microdot. The laser inscribed microdots are visible under UV illumination (i.e., UV active) and, surprisingly, it was found that the intensity of the UV response of the laser-inscribed microdots could be modulated by changing the laser parameters such as power, frequency, speed, line spacing, and focus. For example, intense dots can be obtained using a laser with a track width of 0.03 mm, power at 95%, velocity of 834 mm/s, pulse frequency of 27000 Hz, and Z-offset of 8 and 12 mm, and having hatch settings using lines with a lines spacing of 0.03 mm, 0 mm margin spacing, 90 degree hatching angle, and 1 hatching.

The UV active laser inscribed microdots can be visibly colored (i.e., the localized, laser induced chemical change alters the interaction of the laser treated area to visible light compared to the untreated area) and can be assembled into legible text, logos, and other identifiers to be inscribed or marked on or close to the surface of transparent thermoplastic compositions. The intensity and color of the visible mark can be modulated by varying the laser parameters such as power, frequency, speed, line spacing, focus and this allows marks of varying degrees of visible light viewed legibility or clarity to be generated. The visible light legibility of the laser inscribed microdots can be tuned from an easily readable mark to a semi-covert, barely visible inscription, which may require specialized and sophisticated viewing devices to read and interpret the data or image.

The transparent thermoplastic can also comprise an additive or colorant, which is not normally active under UV light, but can become active when treated with a laser having a wavelength shorter than 1000 nm. Specifically, a laser having a wavelength shorter than 800 nm, and more specifically shorter than 500 nm. Hence, polymer compositions can be modified with low molecular additives that undergo photo-chemical rearrangements to produce areas which interact with light differently (either visible light or non-visible light, e.g., UV active fluorescence) than the untreated background. For example, the use of laser light of the described wavelength to generate microdots of a ortho hydroxy-aryl carbonyl derivate, which when arranged into text, logos, barcodes or images exhibit a UV active color. The non-inscribed areas remain UV inactive. The concept includes, but is not limited to, laser induced de-protection to generation a UV active fluorophore, such as a hydroxyl flavone.

The thermoplastic composition can comprise a photoactive additive or colorant, which in certain media may be regarded as photochromic. Examples of additives can include members of the spiropyran, spirooxazine, fulgide, diarylethene, spirodihydroindolizine, azo-compounds, and Schiff base, benzo- and naphthopyrans families, and combinations comprising at least one of the foregoing. Photochromism, as used herein, can be defined as a reversible transformation of a chemical species (A and B), induced in one or both directions by electromagnetic radiation as shown below:

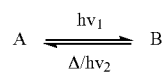

The two states A and B have distinguishable light absorptions in different regions of the spectrum. Reversibility is the main criterion for photochromism, as irreversible color change induced by light belongs to normal photochemical rearrangement category and cannot be regarded as photochromism. Photochromic compounds require an environment in which they can reversibly transform. Without being bound by any particular theory, in solid polymer matrices, the rate at which photochromic process of activation and fading is believed to be dependent on the free volume in the polymer matrix. The free volume of the polymer matrix is related to the flexibility of the polymer chain segments surrounding the photochromic compound. For example, the performance of photochromic compounds in polycarbonate (PC) is poor because PC doesn't have sufficient internal free volume for them to function properly, i.e., to achieve an acceptable activated intensity and acceptable rate of activation and fade. As shown in FIG. 7, an SEM image of UV inscribed microdots indicates that the interaction has a thermal element. The thermoplastic composition and process described herein allows photochromism to take place. In other words, the efficiency of the conversion to the B form described above can be increased as a consequence of the increase in matrix free volume during the laser treatment, i.e., the change of phase from solid to molten and the resulting increase in matrix flexibility. The color change can be permanent, or the photo or thermal reversion to the form A can be dramatically slowed.

Further described herein a method and article that enables the production of consistent dark marks on any substrate regardless of color and opacity. As used herein, a dark mark has an L* value of less than or equal to 40 (specular included), and specifically less than or equal to 35 when measured on a white background. More specifically, a dark mark can have an L* less than or equal to 25 (specular excluded) and less than 20 when measured on a white background. Unless specifically stated otherwise, L* is determined according to ASTM E308-08 and CIELAB 1976. Previously, when a mark was formed on colored substrates, the color of the mark between different substrates was different. Consistency was not obtained. It has been discovered that by decoupling the mark from the substrate, any substrate can be used (e.g., any color and any transparency). Hence, the substrate is not limited to a highly reflective, white composition to obtain a consistent dark mark (on different substrate samples).

When the mark was decoupled from the substrate, e.g., placed in a layer over the substrate, inconsistent dark marks were still formed. Surprisingly, a consistent dark mark was formed when the mark was decoupled from the substrate and located in a layer between a transparent layer (i.e., transmission less than or equal to 85% of the wavelength of laser light used to form the mark) and the substrate.

Hence, the multilayer article comprises a transparent layer disposed on a substrate, with a weak absorbing layer therebetween layer(s) restricting the interaction and the laser to that layer an assembly of transparent layers comprising one or more sections that restricts or contains the strong interaction required to generate a dark laser mark to either the surface of, or within a particular layer or series of layers. Thus, it is possible to decouple the strongest interaction of the laser from other layers, sections or substrates to enable a consistent dark to gray-scale contrast regardless of the substrate color or composition.

The articles can comprise a multilayer construct, wherein each layer can be formed of 25 to 500 micrometers thick films or sections that are transparent to visible light (e.g. Tvis of at least 80% measured by ASTM D103 Procedure A). Specifically, each layer can be 25 to 300 micrometers thick films or sections. More specifically, each layer can be 25 to 200 micrometers thick films or sections. The articles can be comprised of at least two layers, for achieving a dark laser mark. The sections are constructed so as to contain or restrict the interaction of the laser to either the surface of, or more specifically within, the transparent films or sections that are transparent to visible light. Each section can be defined by the role or function it has with the laser light. The process enables excellent dark to gray-scale contrast levels for logos, text, and images to be inscribed on or within the films or sections that are transparent to visible light regardless of the substrate color or composition.

Transparent thermoplastic compositions can include compositions comprising polymers such as polycarbonate, bisphenol-A polycarbonate based copolymers, polyesters, polymethyl methacrylate (PMMA), polystyrene, polybutylene terephthalate, polyolefins, polyamides, polyvinylchloride, polylactic acid, and combinations thereof.

When the laser wavelength used to generate the dark mark has a wavelength greater than 900 nm, e.g., 1064 nm, the construct of films or sections that is transparent to visible light comprises a transparent near infrared (NIR) reflecting section (or multilayer) below a NIR absorbing layer. The NIR absorbing layer can comprise laser absorbing additives such as carbon black, lanthanum hexaboride, and/or cesium tungsten oxide. An additional section that is transparent to visible light and is additionally NIR transparent can be adjoined to the NIR absorbing layer. The article can contain a section or film that is predominantly NIR transparent adjacent to or on top of the weak NIR absorbing film or section.

The arrangement of films or sections that are transparent to visible light can be adjoined (for example via co-extrusion, lamination, or in mold decoration processes) to a substrate wherein the NIR reflecting section (or multilayer) is adjacent to the substrate allowing a consistent dark laser mark to be achieved regardless of the substrate composition or color. In addition, the substrate can be opaque or transparent and have a range of visible colors.

When the laser wavelength used to generate the dark mark is shorter than 900 nm, specifically less than 500 nm, and more specifically less than 400 nm, the layers that are transparent to visible light comprises a weak ultra violet absorbing (UVA) section. The weak UVA section can be located below a section or film that is transparent in to ultraviolet light (UV). As used herein, weak UVA means a material that includes less than 200 ppm (parts per million) of an UV absorbent additive. More specifically, weak UVA can comprise less than 100 ppm of a UV absorbent additive. Even more specifically, weak UVA can comprise less than 50 ppm of a UV absorbent additive. The UVA absorbent additive can comprise an UV absorbing polymer, resin, or additives such as carbon black, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, nano-scale inorganic additives such as lanthanum hexaboride, cesium tungsten oxide, and combinations thereof. It was found that a darker mark could be applied when one or more UV transparent layers are located above the UVA layer. As used herein, a UV transparent layer is a layer that does not interact with a laser having a wavelength of less than or equal to 500 nm. In other words, no mark is formed when the layer is exposed to a laser having a wavelength of less than or equal to 500 nm.

An additional strong UVA layer can be adjoined to the weak UVA section. As used herein, strong UVA means UV transmission less than 20%, and more specifically less than 10% and even more preferably less than 10%. The use of a strong UVA layer allows for black and white images to be produced on a transparent series of films. A white mark is applied to the lower strong UVA section with a laser having a wavelength shorter than 600 nm (specifically less than 500 nm and more specifically less than 400 nm). A dark mark is produced in the weak UVA layer by irradiating the sections via the UV transparent section.

An article can be an arrangement of films or sections that are transparent to visible light and comprise at least a bilayer of weak and strong UVA that are adjoined (e.g., via co-extrusion, lamination or in mold decoration processes). The substrate can be opaque or transparent. The strong UVA section can be adjacent to the substrate, which allows a consistent dark laser mark to be achieved regardless of the substrate composition or color. The composition can contain a section or film that is predominantly UV transparent adjacent to or on top of the weak UVA section.

The following examples are merely illustrative of the disclosed herein and are not intended to limit the scope hereof.

EXAMPLES

Various compositions were tested to determine their interaction with laser light and their ability to be inscribed. Thermoplastic test specimens were prepared by melt extrusion on a Werner & Pfleiderer 25 mm twin screw extruder, using a nominal melt temperature of 290° C. to 310° C., pressure of 25 inches (635 mm) of mercury vacuum and 450 revolutions per minute (rpm). The extrudate was pelletized and dried at 110° C. for 3 hours. Test specimens were produced (60 mm×60 mm×2 mm) from the dried pellets and were injection molded at nominal temperatures of 290° C. to 320° C.

The color data was acquired on an X-rite I-7 spectrophotometer in the range 360 nm to 750 nm. The transmission data was acquired using a 25 mm aperture, while the reflection data was acquired in specular excluded mode using a 10 mm aperture with a RAL 9005-GL card placed behind the part. RAL is a color standard used in Europe. The transmission and reflection data was measured using parts having a thickness of 1 mm according to ASTM D1003-00 using D65 illumination and 10 degrees observer. The color from the laser inscribed areas was evaluated on a 15 mm×15 mm square using the 10 mm aperture with a RAL 9005-GL card placed behind the laser marked square. The visible transmission (i.e., Tvis) measurements were acquired on a HAZE-GUARD plus from BYK-Gardner instruments.

A Trumark 6330 laser (355 nm), which has a power output of 2 Watts (W), and a Trumark 6130 laser (1064 nm) were used to inscribe the test pieces with a processing matrix consisting of a range of laser conditions such as frequency of 20 to 40 kiloHertz (kHz), speed of 600 to 1800 millimeters per second (mm/sec), and a fill factor of 0.03 to 0.45 mm, i.e., the spacing between adjacent lines of laser dots. The power setting was 95% unless otherwise stated. Scanning electron microscopy (SEM) was used to acquire SEM micrographs using a FEI XL 30 microscope, operated at a voltage of 15 kiloVolts (kV). Samples were coated with gold (Au) and/or palladium (Pd) prior to the SEM investigation. Optical images were obtained using an Olympus BX60F microscope, in reflection and transmission mode. The laser marked plaques were scanned using an Epson Perfection V750-Pro. The images were acquired with a 600 dot per inch (dpi) setting. The laser marked plaques were placed on a RAL 9005-GL card and a RAL 9010-GL card was placed beside it for referencing on a scale of 0 to 255. The acquired images were evaluated using ImageJ 1.44 software to measure the contrast on the front and the back of the sample (see e.g., Table 8).

Profilometry measurements were obtained using a Veeco Dektak 6M Stylus Profiler using the following experimental conditions: scan length: 2700 μm, resolution 0.265 μm/s, stylus force 3 mg. Calibration was performed using a standard of known dimensions: nominal 10 KA (1 μm), measuring report (SI).

For welding, high gloss surface test pieces were placed together with the corresponding high gloss surface part, where the top samples were laser transparent at wavelengths of greater than 800 nm and laser absorbing at wavelengths less than 500 nm and the lower samples were laser absorbing at wavelengths greater than 800 nm. The overlapped area was then irradiated with a diode laser (960 nm) with a beam diameter of 2 mm.

The materials used for the compositions are listed in Table 2. Samples were made using various combinations of the materials listed in Table 2. The samples were made as described above. The samples were then laser marked with a UV laser (e.g., having a laser beam with a wavelength of 355 nm) and a near infrared laser (NIR) (e.g., having a laser beam with a wavelength of 1064 nm) to determine the ability of the samples to be marked. As described and used herein, UV light refers to light having a wavelength of 10 nm to 400 nm, while near-infrared light refers to light having a wavelength of 700 nm to 5,000 nm. Unless otherwise stated, the samples had a thickness of 1 mm.

TABLE 2

Material Description

| Component | Description | Source |
|---|---|---|
| PC1 | Bisphenol-A based polycarbonate resin ($M_w$ = 30,000 g/mol, PS standards) | Lexan ™ resin, SABIC Innovative Plastics |
| PC2 | Bisphenol-A based polycarbonate resin ($M_w$ = 22,000 g/mol, PS standards) | Lexan ™ resin, SABIC Innovative Plastics |
| PC3 | Poly(20 wt. % isophthalate-terephthalate-resorcinol ester)-co-(80 wt. % bisphenol-A carbonate) copolymer ($M_w$ = 60,000 g/mol, PS standards) | SABIC Innovative Plastics |
| PC4 | Poly(90 wt. % isophthalate-terephthalate-resorcinol)-co-(10 wt. % bisphenol-A carbonate) copolymer ($M_w$ = 40,000 g/mol, PS standards) | SABIC Innovative Plastics |
| PC5 | PC/PDMS copol (20% siloxane) | SABIC Innovative Plastics |
| PC6 | DMBPC-BPA (50:50) Copolycarbonate ($M_w$ = 22,000 g/mol, PS standards) | SABIC Innovative Plastics |
| PC7 | PPPBP/BPA (35:65) Copolycarbonate ($M_w$ = 25,000 g/mol, PS standards) | SABIC Innovative Plastics |
| PC8 | Transparent PC-siloxane copolymer ($M_w$ = 23,000 g/mol, PS standards) | SABIC Innovative Plastics |
| PC9 | Branched PC ($M_w$ = 38,000 g/mol, PS standards) | SABIC Innovative Plastics |
| PC10 | Bisphenol-A based polycarbonate resin ($M_w$ = 35,000 g/mol, PS standards) | Lexan ™ resin, SABIC Innovative Plastics |

TABLE 2-continued

Material Description

| Component | Description | Source |
|---|---|---|
| CYASORB UV-3638 | 2,2(P-PHENYLEN)DI-3,1BENZOXAZIN | CYTEC INDUSTRIES BV |
| UVA 234 | 2-(2 hydroxy-3,5 dicumyl) benzotriazole | Tinuvin 234, Ciba Specialty Chemicals |
| PCTG | Poly(20 mol % ethylene terephthalate)-co-(80 mol % 1,4-cyclohexanedimethyleneterephthalate) ($M_w$ = 70,000 using polystyrene standards) | Eastman Chemical Co. |
| PETS | Pentaerythritol tetrastearate | Lonza, Inc. |
| Pigment Black 7 | Printex 85, Monarch 800 | DEGUSSA AG, Cabot |
| UVA 5411 | 2-(2 hydroxy-5-t-octylphenyl) benzotriazole | Tinuvin 329, Ciba Specialty Chemicals |
| AO1076 | Octadecyl (3,5-di-tert-butyl-4-hydroxyphenyl)propionate | Irganox 1076, Ciba Specialty Chemicals |
| Loxiol EP8578 | Palmitic/Stearic Acid Ester of Dipenta/Pentaerythritol | COGNIS OLEOCHEMICALS GMBH |
| PPC-resin | Amorphous poly(ester-carbonate), bisphenol A based poly(phthalate-carbonate) containing 80% isophthalate-terephthalate ester units ($M_w$ = 28,500 g/mol, using polystyrene standards) | SABIC Innovative Plastics |
| Pigment Blue 60 | Copolyestercarbonate, known as bisphenol acetone based (poly(phthalate carbonate) containing 60% ester ($M_w$ = 28,000 g/mol, PS standards) | BASF |
| Solvent violet 36 | 1,8-Bis[(4-methylphenyl)amino]-9,10-anthracenedione | LANXESS, (Macrolex Violet 3R) |
| Solvent Red 135 | MACROLEX ™ Red EG | Lanxess |
| Solvent Yellow 98 | 2-Octadecyl-1H-thioxantheno[2,1,9-def]isoquinoline-1,3(2H)-dione | Clariant, Hostasol Gelb 3G |
| Vat Red 41 | 1H-Thioxantheno[2,1,9-def]isoquinoline-1,3(2H)-dione,2-octadecyl | Clariant, Hostasol Red 5B |
| Solvent Blue 104 | 1,4-bis(2,4,6-trimethylanilino)-anthraquinone | Clariant, Sandoplast Blue 2B |
| Solvent Yellow 163 | 1,8-Bis(phenylthio)anthraquinone | Ciba Speciality Chemicals, ORACET ™ Yellow GHS |
| Copper Phthalocyanine Pigment Blue 15:4 | Copper, (29H,31H-phthalocyaninato(2-)-N29,N30,N31,N32)-, (SP-4-1) | BASF, Heliogen Blue K7100 |
| Pigment Green 7 | Cu-Phthalocyanine Halogenated | BASF, Heliogen Green K8730 |
| Copper Phthalocyanine Pigment Blue 15:1 | Copper, (29H,31H-phthalocyaninato(2-)-N29,N30,N31,N32)-, (SP-4-1)- | BASF, Heliogen Blue K6911D |
| Solvent Violet 13 | 1-(p-methylaniline)-4-hydroxy anthraquinone | Lanxess, Macrolex Violet B |
| Pigment Blue 15:4 | Copper Phthalocyanine Beta | BASF, Heliogen Blue K7104LW |
| Solvent green 28 | Macrolex Green G | LANXESS |
| Disperse Yellow 201 | MACROLEX YELLOW 6G | LANXESS |
| Solvent Yellow 93 | MACROLEX YELLOW 3G | LANXESS |
| Pigment Yellow 147 | ORACET YELLOW RB | Ciba Speciality Chemicals |
| Disperse Orange 47 | Macrolex Orange R | LANXESS |
| Solvent Red 52 | Nacrolex Red 5B | LANXESS |
| Solvent orange 63 | Hostasol Red GG | Clariant |
| Solvent Red 207 | 1,5-Bis(cyclohexylamino)anthraquinone | COLOR CHEM |
| Pigment Yellow 138 | 3,4,5,6-Tetrachloro-N-[2-(4,5,6,7-tetrachloro-2,3-dihydro-1,3-dioxo-1H-inden-2-yl)-8-quinolyl]phthalimide | BASF, Paliotol Yellow K 0961 HD |
| Phosphonite PEPQ | Mixture of phosphonous acid esters | Irgafos PEPQ, Ciba Specialty Chemicals |
| Epoxy | 3,4-epoxy cyclohexyl methyl-3,4-epoxy cyclohexyl carboxylate | Epoxy Resin ERL 4221, Dow Chemical |
| $TiO_2$ | Titanium dioxide | KRONOS ™ 2233 |
| KSS | potassium diphenylsulphon-3-sulphonate | SEAL SANDS CHEMICALS LTD |
| PTFE & T-SAN | 50% Poly(tetrafluoroethylene) + 50% E-SAN | SABIC Innovative Plastics |
| Antioxidant | tris(2,4-di tert.butylphenyl) phosphite | Irgafos 168, Ciba Specialty Chemicals |

TABLE 2-continued

Material Description

| Component | Description | Source |
|---|---|---|
| Phosporic Acid solution | Phosporic Acid diluted with Water to 10% | QUARON |
| Styrene-acrylate-epoxy oligomer | Joncryl ADR4368S | BASF |
| Solvent Green 3 | MACROLEX ™ GREEN 5B | Lanxess |
| AO1010 | Pentaerythritol tetrakis(3,5-di-tert-butyl-4-hydroxyhydrocinnamate) | Irganox 1010, Ciba Specialty Chemicals |
| LaB$_6$ (lanthanum hexaboride) master batch in polycarbonate | KHCS-06 TM (pigment dispersion 0.25% LaB$_6$ in PC) | Alconix Europe GmbH |
| OB | Di-(tert.)butyl-benzoxazolyl thiophene | BASF |
| CTO (cesium tungsten oxide) master batch in polycarbonate | YMCS-06 TM (pigment dispersion 1.23% CTO in PC) | Alconix Europe GmbH |
| PMMA | Plexiglas 8N | Evonik Degussa GmbH |
| Polystyrene | SP256 | Supreme Petrochem LTD |
| Grialamid TR55 | GRILAMID TR 55 LX (transparent thermoplastic polyamide based on aliphatic and cycloaliphatic blocks) | EMS-Grivory |

Example 1

Tables 3 through 7 list formulations and laser marking ability of samples produced using the methods and compositions disclosed herein. Each of the samples comprised a first component having a thickness of 1 mm and the compositions disclosed in the tables. The results of Comparative Examples 1 to 5 (C1-C5) are illustrated in Table 3, while the results for Samples 1 to 5 are illustrated in Table 4. As can be seen from Table 3, C1 exhibited poor interaction with laser light (UV through to near infrared), giving an inhomogenous mark. When a small amount of carbon black was added to the samples as demonstrated in C2 to C5, the interaction with the 1064 nm laser light improved, giving a more homogenous dark mark as the loading of carbon black was increased via a carbonization process. The addition of carbon black, however, greatly impairs the color and transmission levels of visible light and the Tvis as measured according to ASTM D1003. A greyish mark is achieved when these parts are irradiated with a UV laser with some increase in reflection and L*, but the mark is much darker when viewed and measured from the rear side through the 1 mm part due to increased absorption from a carbonization type process. The laser light (UV through to near infrared) passed through the 1 mm parts and marked or otherwise intersected with a laser sensitive substrate placed under the parts for C1 to C5.

Surprisingly, Sample 1, comprising a first component having a thickness of 1 mm, was able to be inscribed with a light mark when laser light with a wavelength less than or equal to 500 nm was utilized. Even more surprising was that in Sample 1, the measured L* and reflection of the UV laser marked areas are more or less the same when viewed and measured from the rear side. Such a characteristic is very desirable in cases where the laser mark is applied on the opposite side to the viewing side. Additionally, a laser sensitive substrate placed underneath Sample 1 remained unmarked. It was also surprising to discover that the addition of an organic additive capable of strongly absorbing light at wavelengths less than or equal to 500 nm to give Sample 2, also gave a light colored mark when laser light having a wavelength of less than or equal to 500 nm was utilized. Unlike the addition of carbon black with C2 to C5, in Sample 2, the color and Tvis were essentially unchanged.

The addition of an organic additive capable of strongly absorbing light at wavelengths less than or equal to 500 nm as in Sample 4 compared to Sample 1, improved the contrast and additionally broadened the laser marking process window by increasing the marking speed. Surprisingly, the combination of small amounts of carbon black to Samples 2 and 4, giving Samples 3 and 5, increased the L* and reflection of the mark achieved from a laser with a wavelength less than or equal to 50 nm without compromising the color of the mark on the rear side due to carbonization. In Samples 1 to 5, the interaction between the laser and the sample was restricted to the first component having a thickness of 1 mm. The intense light from the laser did not pass through the first component and mark the laser sensitive substrate, unlike in C1 to C5, indicating that the inclusion of an organic additive with a strong absorption of light less than or equal to 500 nm can protect an underlying substrate from being marked with a laser beam.

Similar trends were seen in the samples displayed in Tables 5 to 7, which included resins such as polystyrene, polyamide, and polymethylmethacrylate.

TABLE 3

| Material | C1 | C2 | C3 | C4 | C5 |
|---|---|---|---|---|---|
| PC1 | 99.65 | 99.6498 | 99.649 | 99.648 | 99.646 |
| PETS | 0.3 | 0.3 | 0.3 | 0.3 | 0.3 |
| Irgafos 168 | 0.05 | 0.05 | 0.05 | 0.08 | 0.08 |
| AO1076 | | | | | |
| Pigment Black 7 | | 0.0002 | 0.001 | 0.002 | 0.004 |
| Total | 100 | 100 | 100 | 100 | 100 |
| Tvis | 88 | 87 | 80 | 72 | 57 |
| % Transmission at 360 nm (%) | 78 | 72 | 62 | 52 | 34 |
| L* of substrate (reflection mode) | 5 | 6 | 5 | 4 | 3 |
| Average % reflection (360-700 nm) | 0.8 | 0.6 | 0.6 | 0.4 | 0.3 |

TABLE 3-continued

| Material | C1 | C2 | C3 | C4 | C5 |
|---|---|---|---|---|---|
| substrate | | | | | |
| 355 nm laser beam marking | | | | | |
| Substrate marked | Yes | Yes | Yes | Yes | Yes |
| L* of selected mark (front side) | 43 | 40 | 47 | 47 | 47 |
| L* of selected mark (back side) | 21 | 19 | 13 | 14 | 12 |
| Delta L* mark | 22 | 21 | 34 | 33 | 35 |
| Average % reflection mark (front side) | 12.7 | 11.2 | 15.4 | 15.7 | 15.6 |
| Average % reflection mark (rear side) | 3.1 | 2.7 | 1.6 | 1.4 | 1.4 |
| Delta % Reflection mark | 9.6 | 8.5 | 13.8 | 14.3 | 14.2 |
| 1064 nm laser beam marking | | | | | |
| Substrate marked | Yes | Yes | Yes | Yes | Yes |

TABLE 4

| Material | 1 | 2 | 3 | 4 | 5 |
|---|---|---|---|---|---|
| PC1 | 17.58 | 99.4 | 99.3998 | 17.58 | 17.58 |
| PC7 | 82 | | | 81.75 | 81.7498 |
| PETS | 0.3 | 0.3 | 0.05 | 0.3 | 0.3 |
| Irgafos 168 | 0.08 | 0.05 | 0.3 | 0.08 | 0.08 |
| AO1076 | 0.04 | | | 0.04 | 0.04 |
| UVA 5411 | | 0.25 | 0.25 | 0.25 | 0.25 |
| Pigment Black 7 | | | 0.0002 | | 0.0002 |
| Total | 100 | 100 | 100 | 100 | 100 |
| Tvis | 89 | 88 | 86 | 88 | 88 |
| % Transmission at 360 nm | 58 | 2 | 2 | 2 | 2 |
| L* of substrate (reflection mode) | 4 | 5 | 4 | 4 | 4 |
| Average % reflection (360-700 nm) substrate | 0.8 | 0.7 | 0.4 | 0.6 | 0.4 |
| 355 nm laser beam marking | | | | | |
| Substrate marked | No | No | No | No | No |
| L* of selected mark (front side) | 55 | 65 | 66 | 57 | 58 |
| L* of selected mark (back side) | 53 | 59 | 61 | 52 | 56 |
| Delta L* mark | 2 | 6 | 5 | 5 | 2 |
| Average % reflection mark (front side) | 21.1 | 27.8 | 33.3 | 22.7 | 23.9 |
| Average % reflection mark (rear side) | 19.0 | 22.9 | 25.3 | 18.6 | 20.7 |
| Delta % Reflection mark | 2.1 | 4.9 | 8.0 | 4.1 | 3.2 |
| 1064 nm laser beam marking | | | | | |
| Substrate marked | Yes | Yes | Yes | Yes | Yes |

TABLE 5

| Material | C6 | C7 | C8 | 6 | 7 | 8 | 9 | 10 |
|---|---|---|---|---|---|---|---|---|
| PC6 | 99.5 | 99.4998 | 99.4995 | 99.25 | | | | |
| PC2 | | | | | 18 | 18 | | |
| PETS | 0.4 | 0.4 | 0.4 | 0.4 | | | 0.3 | 0.3 |
| AO1076 | 0.1 | 0.1 | 0.1 | 0.1 | 0.06 | 0.06 | 0.05 | 0.05 |
| UVA 5411 | | | | 0.25 | | 0.25 | | 0.25 |
| PC9 | | | | | | | 99.65 | 99.4 |
| PC8 | | | | | 81.94 | 81.69 | | |
| Pigment Black 7 | | 0.0002 | 0.0005 | | | | | |
| Total | 100 | 100 | 100 | 100 | 100 | 100 | 100 | 100 |
| Tvis | 88 | 88 | 81 | 87 | 85 | 83 | 87 | 87 |
| % Transmission at 360 nm | 76 | 74 | 72 | 2 | 75 | 2 | 71 | 2 |
| L* of substrate (reflection mode) | 5 | 4 | 3 | 5 | 6 | 5 | 5 | 5 |
| Average % reflection (360-700 nm) substrate | 0.6 | 0.4 | 0.5 | 0.5 | 0.8 | 0.6 | 1.2 | 0.7 |
| 355 nm laser beam marking (95% power) | | | | | | | | |
| Substrate marked | Yes | Yes | Yes | No | Yes | No | Yes | No |
| L* of selected mark (front side) | 38 | 41 | 43 | 67 | 38 | 61 | 36 | 54 |
| L* of selected mark (back side) | 22 | 16 | 15 | 61 | 28 | 55 | 24 | 50 |
| Delta L* mark | 16 | 25 | 28 | 6 | 10 | 6 | 12 | 4 |
| Average % reflection mark (front side) | 9.7 | 11.7 | 12.6 | 33.7 | 9.9 | 27.3 | 10.5 | 21.9 |
| Average % reflection mark (rear side) | 3.3 | 2.1 | 1.8 | 25.3 | 5.4 | 20.4 | 5.9 | 19.4 |
| Delta % Reflection mark | 6.4 | 10 | 11 | 8.4 | 4.5 | 6.8 | 4.6 | 2.5 |
| 1064 nm laser beam marking (95% power) | | | | | | | | |
| Substrate marked | Yes | Yes | Yes | Yes | Yes | Yes | Yes | Yes |

TABLE 6

| Material | C9 | 11 | 12 | 13 | 14 | 15 |
|---|---|---|---|---|---|---|
| PC3 | 99.61 | 99.36 | | | | |
| PETS | 0.3 | 0.3 | 0.3 | 0.3 | 0.3 | 0.3 |
| Epoxy | 0.03 | 0.03 | 0.03 | 0.03 | 0.03 | 0.03 |
| Phosphonite PEPQ | 0.06 | 0.06 | 0.06 | 0.06 | 0.06 | 0.06 |
| UVA 5411 | | 0.25 | | 0.25 | | 0.25 |
| PC4 | | | | | 99.61 | 99.36 |
| PPC-resin | | | 99.61 | 99.36 | | |
| Total | 100 | 100 | 100 | 100 | 100 | 100 |
| Substrate marked | Yes | No | No | No | No | No |
| Tvis | 89 | 90 | 89 | 89 | 91 | 84 |
| % Transmission at 360 nm | 74 | 2 | 51 | 2 | 38 | 1 |
| L* of substrate (reflection mode) | 7 | 7 | 4 | 4 | 14 | 14 |
| Average % reflection (360-700 nm) substrate | 0.8 | 0.8 | 0.5 | 0.4 | 2.1 | 1.7 |
| 355 nm laser beam marking | | | | | | |
| L* of selected mark (front side) | 43 | 62 | 52 | 59 | 55 | 60 |
| L* of selected mark (back side) | 36 | 58 | 49 | 58 | 50 | 56 |
| Delta L* mark | 7 | 4 | 3 | 1 | 5 | 4 |
| Average % reflection mark (front side) | 12.8 | 28.0 | 18.9 | 24.0 | 21.3 | 25.8 |
| Average % reflection mark (rear side) | 8.3 | 22.8 | 15.3 | 21.2 | 16.9 | 20.9 |
| Delta % reflection mark | 4.5 | 5.3 | 3.6 | 2.8 | 4.5 | 4.9 |
| 1064 nm laser beam marking | | | | | | |
| Substrate marked | Yes | Yes | Yes | Yes | Yes | Yes |

Figure 4:
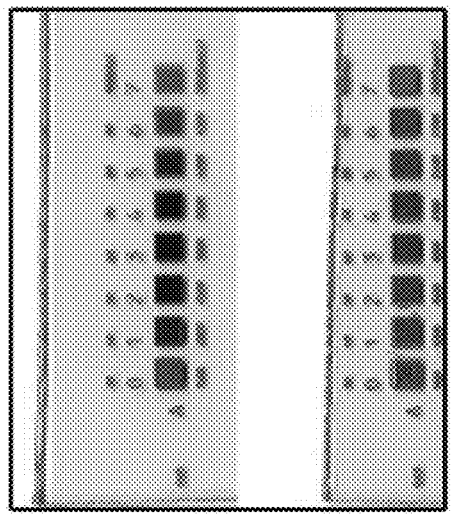
FIG. 4 is a scanned image of Comparative Example 3 on a white background and which was inscribed with a 1064 nanometer laser beam.
Figure 3:
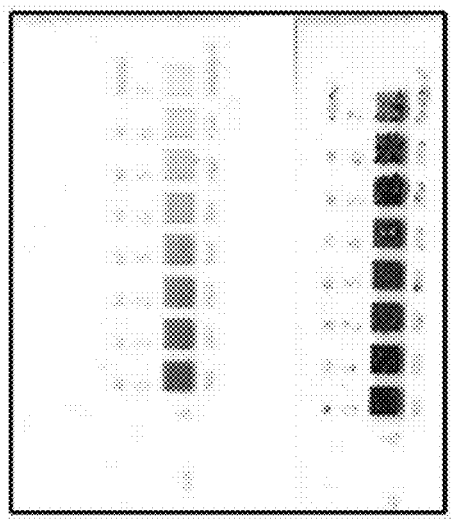
FIG. 3 is a scanned image of Comparative Example 2 on a white background and which was inscribed with a 1064 nanometer laser beam.
Figure 2:
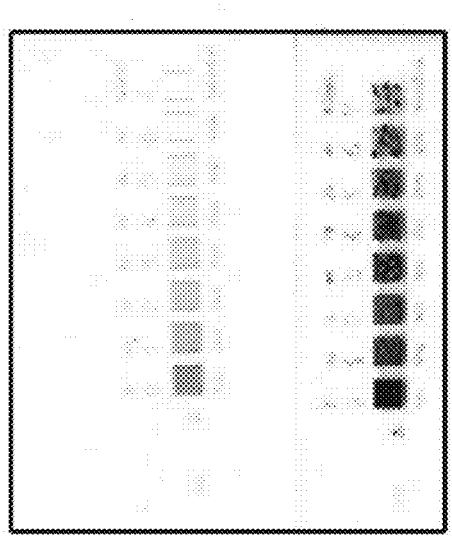
FIG. 2 is a scanned image of Comparative Example 1 on a white background and which was inscribed with a 1064 nanometer laser beam.

FIGS. 2, 3, and 4 illustrate scanned images of C1, C2, and C3, respectively. The samples were laser inscribed with a 1064 nm laser beam. The 1 mm parts were placed on a white background to emphasize contrast with the lower images in each of the figures showing the effect (i.e., inhomogeneous interaction) of lowering the line spacing from 0.05 mm to 0.03 mm

TABLE 7

| Material | C10 | C11 | C12 | 16 | 17 | 18 |
|---|---|---|---|---|---|---|
| Grialamid TR55 | 100 | | | 90.6 | | |
| PMMA | | 100 | | | 90.6 | |
| Polystyrene | | | 100 | | | 90.6 |
| CYASORB UV-3638 | | | | 0.4 | 0.4 | 0.4 |
| Total | 100 | 100 | 100 | 100 | 100 | 100 |
| Tvis | 92 | 92 | 90 | 88 | 92 | 86 |
| % Transmission at 360 nm | 34 | 38 | 82 | 9 | 3 | 2 |
| L* of substrate (reflection mode) | 4 | 4 | 5 | 4 | 4 | 5 |
| Average % reflection (360-700 nm) substrate | 0.5 | 0.4 | 0.6 | 0.5 | 0.5 | 0.5 |
| 355 nm laser beam marking (95% power) | | | | | | |
| Substrate marked | No | No | Yes | No | No | No |
| L* of selected mark (front side) | — | — | 38 | 61 | 63 | 48 |
| L* of selected mark (back side) | — | — | 23 | 58 | 58 | 44 |
| Delta L* mark | — | — | 15 | 3 | 5 | 3 |
| Average % reflection mark (front side) | — | — | 9.9 | 28.4 | 29.7 | 15.8 |
| Average % reflection mark (rear side) | — | — | 3.7 | 23.1 | 23.8 | 12.3 |
| Delta % reflection mark | — | — | 6.3 | 5.3 | 5.9 | 3.5 |
| 355 nm laser beam marking (85% power) | | | | | | |
| L* of selected mark (front side) | — | — | — | 58 | 64 | 51 |
| L* of selected mark (back side) | — | — | — | 53 | 60 | 47 |
| Delta L* mark | — | — | — | 5 | 4 | 4 |
| Average % reflection mark (front side) | — | — | — | 24.7 | 31.6 | 18.1 |
| Average % reflection mark (rear side) | — | — | — | 18.7 | 25.1 | 15.5 |
| Delta % reflection mark | — | — | — | 6.0 | 6.5 | 3.5 |
| 355 nm laser beam marking (75% power) | | | | | | |
| L* of selected mark (front side) | — | — | — | 43 | 61 | 38 |
| L* of selected mark (back side) | — | — | — | 37 | 59 | 23 |
| Delta L* mark | — | — | — | 6 | 2 | 15 |
| Average % reflection mark (front side) | — | — | — | 12.4 | 28.0 | 9.9 |
| Average % reflection mark (rear side) | — | — | — | 8.5 | 24.3 | 3.7 |
| Delta % reflection mark | — | — | — | 3.9 | 3.7 | 6.3 |
| 1064 nm laser beam marking | | | | | | |
| Substrate marked | Yes | Yes | Yes | Yes | Yes | Yes |

Example 2

In this example, the effect of different additives on the samples was observed. As seen in C2 to C5, carbon black can be used to enhance the interaction of compositions with laser light to improve the dark mark contrasts (i.e., carbonization). However, the addition of low levels of carbon black can greatly lower the Tvis as measured according to ASTM D1003-00 described above and can lead to little improvement in the color contrast and inscription processing parameters when compared with organic absorbing additives (compare C2 to C5 with Samples 1 to 5). The samples in Tables 8 to 11 illustrate that light colored, reflective marks with little or no carbonization can be achieved across a wide range of concentration types and combinations.

Inorganic additives such as lanthanum hexaboride ($LaB_6$) or Cesium tungsten oxide (CTO) can also be used to enhance the interaction of compositions with laser light and improve mark contrasts. As can be seen in Table 11, the addition of low loadings of these additives did not dramatically lower the Tvis. However, C20 to C26, compositions based solely on these additives, exhibited little improvement in the color as it is believed that carbonization dominates and yields a dark mark. The contrast from the front and back was lower as compared to Samples 34 and 35, which also contained a small amount of a UV absorbing additive. L* of the front side and back side was also much lower for C20 to C26 compared to Samples 34 and 35. Surprisingly the combination or organic absorbing additives with inorganic absorbing additives such as $LaB_6$ or CTO, which are also capable of strongly absorbing light as wavelengths less than or equal to 500 nm, such as in Samples 34 and 35, gave light marks and lower profiles compared with when the organic additives were used alone. The combinations also allowed the generation of light and dark marks in the same composition by changing laser wavelength.

Figure 5:
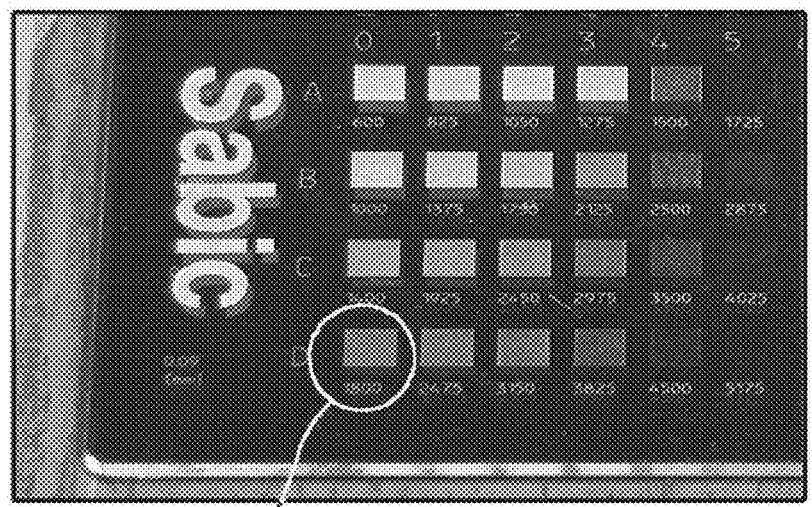
FIG. 5 is a picture of Sample 22 that was laser inscribed with a 355 nanometer laser beam and placed on a black background.
Figure 6:
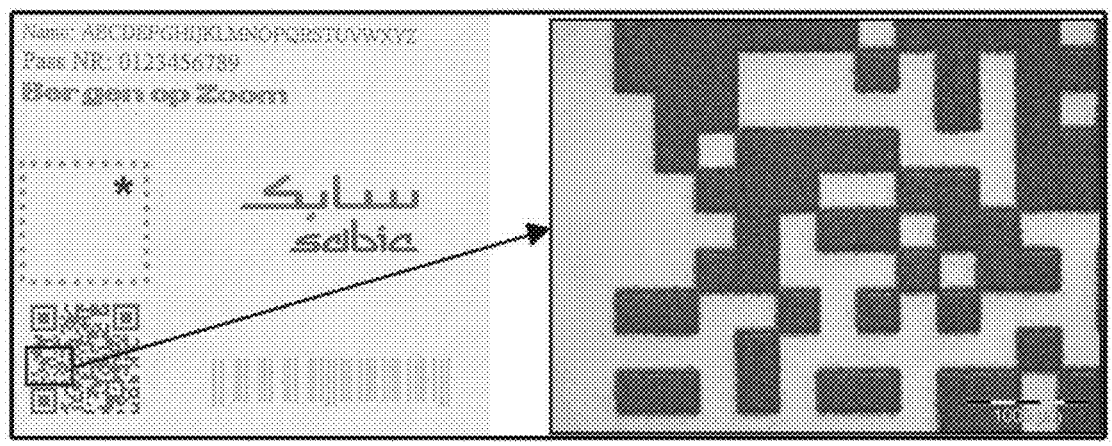
FIG. 6 is a scanned image in transmission mode illustrating the laser inscriptions on Sample 22 including text and barcodes (left image) and an optical image obtained using a microscope of a magnified part of the laser inscription viewed in transmission mode (right image).

FIG. 5 illustrates Sample 22 that was laser inscribed with a 355 nm laser beam. The 2.5 mm thick part was placed on a black background to emphasize contrast. FIG. 6 illustrates a scan of the laser inscriptions on Sample 22 in transmission mode including text and bar codes (left image). The same Quick Response Matrix Barcode (QR code) was inscribed as a watermark in the dotted area and was not visible when scanned. The right image in FIG. 6 was an optical image obtained by using a microscope of a magnified part of the QR code viewed in transmission mode. FIG. 7 is a scanning electron microscope image (×1500 magnification) of the marked square 30 in the lower left hand corner of the matrix of Sample 22 as illustrated in FIG. 5. The thermal effect of the process can be seen from this image.

TABLE 8

| Material | C13 | C14 | C15 | 19 | 20 | 21 | 22 | 23 |
|---|---|---|---|---|---|---|---|---|
| AO1076 | 0.05 | 0.05 | 0.05 | 0.05 | 0.05 | 0.05 | 0.05 | 0.05 |
| UVA 5411 | 0.001 | 0.005 | 0.01 | 0.05 | 0.1 | 0.15 | 0.3 | 0.6 |
| PETS | 0.4 | 0.4 | 0.4 | 0.4 | 0.4 | 0.4 | 0.4 | 0.4 |
| PC6 | 99.52 | 99.51 | 99.51 | 99.47 | 99.42 | 99.37 | 99.22 | 98.92 |
| Pigment Blue 60 | 0.0109 | 0.0109 | 0.0109 | 0.0109 | 0.0109 | 0.0109 | 0.0109 | 0.0109 |
| Solvent violet 36 | 0.0153 | 0.0153 | 0.0153 | 0.0153 | 0.0153 | 0.0153 | 0.0153 | 0.0153 |
| Total | 100 | 100 | 100 | 100 | 100 | 100 | 100 | 100 |
| Tvis | 89 | 89 | 89 | 89 | 89 | 89 | 89 | 89 |
| % Transmission at 360 nm | 68 | 48 | 31 | 4 | 2 | 2 | 2 | 2 |
| L* of substrate (reflection mode) | 6 | 5 | 5 | 4 | 4 | 6 | 5 | 5 |
| Average % reflection (360-700 nm) substrate | 0.7 | 0.5 | 0.5 | 0.4 | 0.4 | 0.6 | 0.5 | 0.5 |
| 355 nm laser beam marking (95% power) | | | | | | | | |
| Contrast front | 105 | 111 | 114 | 118 | 138 | 148 | 138 | 124 |
| Contrast back | 54 | 77 | 78 | 100 | 116 | 132 | 127 | 122 |
| Delta contrast | 51 | 34 | 36 | 18 | 22 | 16 | 11 | 2 |
| Speed (mm/sec) | 600 | 600 | 600 | 675 | 750 | 975 | 1125 | 1125 |
| L* of selected mark (front side) | 44 | 45 | 46 | 56 | 60 | 62 | 61 | 59 |
| L* of selected mark (back side) | 23 | 24 | 28 | 46 | 54 | 57 | 56 | 55 |
| Delta L* mark | 21 | 21 | 18 | 10 | 6 | 4 | 5 | 4 |
| Average % reflection mark (front side) | 13.5 | 14.3 | 14.9 | 22.4 | 26.1 | 28.2 | 27.6 | 24.9 |
| Average % reflection mark (rear side) | 2.7 | 3.8 | 5.0 | 11.5 | 19.4 | 18.3 | 19.2 | 19.6 |
| Delta % Reflection mark | 10.8 | 10.4 | 9.9 | 10.9 | 6.7 | 9.8 | 8.4 | 5.3 |
| 355 nm laser beam marking (85% power) | | | | | | | | |
| Contrast front | — | — | — | 133 | 140 | 146 | 138 | 130 |
| Contrast back | — | — | — | 104 | 121 | 130 | 129 | 125 |
| Delta contrast | — | — | — | 29 | 19 | 16 | 9 | 5 |
| 355 nm laser beam marking (75% power) | | | | | | | | |
| Contrast front | — | — | — | 108 | 150 | 153 | 143 | 137 |
| Contrast back | — | — | — | 89 | 132 | 138 | 132 | 131 |
| Delta contrast | — | — | — | 19 | 18 | 15 | 11 | 6 |

TABLE 9

| Material | C16 | C17 | 24 | 25 | 26 | 27 | 28 |
|---|---|---|---|---|---|---|---|
| AO1076 | 0.05 | 0.05 | 0.05 | 0.05 | 0.05 | 0.05 | 0.05 |
| UVA 234 | 0.0005 | 0.005 | 0.05 | 0.1 | 0.15 | 0.3 | 0.6 |
| PETS | 0.4 | 0.4 | 0.4 | 0.4 | 0.4 | 0.4 | 0.4 |
| PC6 | 99.5233 | 99.5188 | 99.4738 | 99.4238 | 99.3738 | 99.2238 | 98.9238 |
| Pigment Blue 60 | 0.0109 | 0.0109 | 0.0109 | 0.0109 | 0.0109 | 0.0109 | 0.0109 |
| Solvent violet 36 | 0.0153 | 0.0153 | 0.0153 | 0.0153 | 0.0153 | 0.0153 | 0.0153 |
| Total | 100 | 100 | 100 | 100 | 100 | 100 | 100 |
| Tvis | 89 | 89 | 89 | 89 | 89 | 89 | 89 |
| % Transmission at 360 nm | 67 | 43 | 3 | 2 | 2 | 2 | 2 |
| L* of substrate (reflection mode) | 4 | 5 | 3 | 4 | 3 | 4 | 3 |

TABLE 9-continued

| Material | C16 | C17 | 24 | 25 | 26 | 27 | 28 |
|---|---|---|---|---|---|---|---|
| Average % reflection (360-700 nm) substrate | 0.5 | 0.6 | 0.4 | 0.4 | 0.3 | 0.4 | 0.3 |
| 355 nm laser beam marking (95% power) | | | | | | | |
| Contrast front | 106 | 109 | 119 | 152 | 135 | 139 | 127 |
| Contrast back | 56 | 68 | 101 | 126 | 113 | 129 | 120 |
| Delta contrast | 50 | 41 | 18 | 26 | 22 | 10 | 7 |
| Speed (mm/sec) | 600 | 600 | 675 | 750 | 975 | 1050 | 1125 |
| L* of selected mark (front side) | 44 | 45 | 55 | 60 | 60 | 60 | 60 |
| L* of selected mark (back side) | 22 | 25 | 47 | 56 | 55 | 56 | 56 |
| Delta L* mark | 22 | 20 | 8 | 4 | 5 | 4 | 5 |
| Average % reflection mark (front side) | 13.2 | 14.0 | 22.2 | 26.4 | 26.8 | 26.2 | 26.3 |
| Average % reflection mark (rear side) | 2.9 | 3.9 | 14.7 | 20.8 | 19.0 | 18.2 | 18.9 |
| Delta % Reflection mark | 10.3 | 10.2 | 7.5 | 5.5 | 7.8 | 8.0 | 7.4 |
| 355 nm laser beam marking (85% power) | | | | | | | |
| Contrast front | — | — | 131 | 143 | 140 | 137 | 126 |
| Contrast back | — | — | 110 | 126 | 128 | 130 | 124 |
| Delta contrast | — | — | 21 | 17 | 12 | 7 | 2 |
| 355 nm laser beam marking (75% power) | | | | | | | |
| Contrast front | — | — | 124 | 146 | 147 | 143 | 135 |
| Contrast back | — | — | 102 | 130 | 131 | 136 | 128 |
| Delta contrast | — | — | 22 | 16 | 16 | 7 | 7 |

TABLE 10

| Material | C18 | C19 | 29 | 30 | 31 | 32 | 33 |
|---|---|---|---|---|---|---|---|
| AO1076 | 0.05 | 0.05 | 0.05 | 0.05 | 0.05 | 0.05 | 0.05 |
| CYASORB UV-3638 | 0.0005 | 0.005 | 0.05 | 0.1 | 0.15 | 0.3 | 0.6 |
| PETS | 0.4 | 0.4 | 0.4 | 0.4 | 0.4 | 0.4 | 0.4 |
| PC6 | 99.52 | 99.51 | 99.47 | 99.42 | 99.37 | 99.22 | 98.92 |
| Pigment Blue 60 | 0.0109 | 0.0109 | 0.0109 | 0.0109 | 0.0109 | 0.0109 | 0.0109 |
| Solvent violet 36 | 0.0153 | 0.0153 | 0.0153 | 0.0153 | 0.0153 | 0.0153 | 0.0153 |
| Total | 100 | 100 | 100 | 100 | 100 | 100 | 100 |
| Tvis | 89 | 89 | 89 | 89 | 89 | 89 | 89 |
| % Transmission at 360 nm | 65 | 30 | 2 | 2 | 2 | 2 | 2 |
| L* of substrate (reflection mode) | 4 | 5 | 3 | 5 | 3 | 6 | 8 |
| Average % reflection (360-700 nm) substrate | 0.5 | 0.6 | 0.3 | 0.6 | 0.4 | 0.6 | 0.8 |
| 355 nm laser beam marking (95% power) | | | | | | | |
| Contrast front | 106 | 113 | 139 | 154 | 141 | 138 | 126 |
| Contrast back | 52 | 74 | 114 | 129 | 129 | 123 | 119 |
| Delta contrast | 54 | 39 | 25 | 25 | 12 | 15 | 7 |
| Speed (mm/sec) | 600 | 600 | 750 | 825 | 1050 | 1125 | 1312 |
| L* of selected mark (front side) | 44 | 45 | 60 | 63 | 63 | 62 | 58 |
| L* of selected mark (back side) | 22 | 26 | 54 | 58 | 58 | 57 | 57 |
| Delta L* mark | 22 | 19 | 6 | 5 | 5 | 5 | 1 |
| Average % reflection mark (front side) | 13.6 | 14.4 | 26.1 | 29.1 | 29.1 | 27.8 | 24.3 |
| Average % reflection mark (rear side) | 3.3 | 4.4 | 19.1 | 22.5 | 21.9 | 21.0 | 20.3 |
| Delta % reflection mark | 10.3 | 10.0 | 6.9 | 6.6 | 7.1 | 6.8 | 4.0 |
| 355 nm laser beam marking (85% power) | | | | | | | |
| Contrast front | — | 103 | 150 | 157 | 148 | 141 | 135 |
| Contrast back | — | 57 | 130 | 139 | 133 | 132 | 126 |
| Delta contrast | — | 46 | 20 | 18 | 15 | 9 | 9 |

TABLE 10-continued

| Material | C18 | C19 | 29 | 30 | 31 | 32 | 33 |
|---|---|---|---|---|---|---|---|
| 355 nm laser beam marking (75% power) | | | | | | | |
| Contrast front | — | — | 158 | 161 | 150 | 145 | 148 |
| Contrast back | — | — | 135 | 141 | 138 | 140 | 144 |
| Delta contrast | — | — | 23 | 20 | 12 | 5 | 4 |

TABLE 11

| Material | C20 | C21 | C22 | C23 | C24 | C25 | C26 | 34 | 35 |
|---|---|---|---|---|---|---|---|---|---|
| PC6 | 99.52 | 99.47 | 98.52 | 98.02 | 98.52 | 98.02 | 97.52 | 97.72 | 98.22 |
| PETS | 0.4 | 0.4 | 0.4 | 0.4 | 0.4 | 0.4 | 0.4 | 0.4 | 0.4 |
| CYASORB UV-3638 | | | | | | | | 0.3 | 0.3 |
| AO1076 | 0.05 | 0.05 | 0.05 | 0.05 | 0.05 | 0.05 | 0.05 | 0.05 | 0.05 |
| Pigment Blue 60 | 0.0109 | 0.0109 | 0.0109 | 0.0109 | 0.0109 | 0.0109 | 0.0109 | 0.0109 | 0.0109 |
| Solvent violet 36 | 0.0153 | 0.0153 | 0.0153 | 0.0153 | 0.0153 | 0.0153 | 0.0153 | 0.0153 | 0.0153 |
| CTO MB in PC | | | | | 1 | 1.5 | 2 | 1.5 | |
| LaB$_6$ MB in PC | | 0.05 | 1 | 1.5 | | | | | 1 |
| Total | 100 | 100 | 100 | 100 | 100 | 100 | 100 | 100 | 100 |
| Tvis | 90 | 88 | 85 | 83 | 90 | 89 | 89 | 90 | 85 |
| % Transmission at 360 nm | 78 | 67 | 57 | 48 | 73 | 69 | 65 | 2 | 2 |
| L* of substrate (reflection mode) | 6 | 5 | 5 | 5 | 5 | 4 | 5 | 6 | 9 |
| Average % reflection (360-700 nm) substrate | 0.7 | 0.7 | 0.7 | 0.7 | 0.6 | 0.5 | 0.6 | 0.6 | 1.0 |
| 355 nm laser beam marking (95% power) | | | | | | | | | |
| Contrast front | 98 | 88 | 92 | 104 | 90 | 101 | 103 | 165 | 169 |
| Contrast back | 56 | 32 | 17 | 18 | 41 | 31 | 31 | 143 | 129 |
| Delta contrast | 42 | 56 | 75 | 86 | 50 | 70 | 71 | 22 | 39 |
| L* of selected mark (front side) | 32 | 44 | 45 | 45 | 43 | 43 | 45 | 67 | 66 |
| L* of selected mark (back side) | 20 | 13 | 12 | 13 | 15 | 16 | 16 | 62 | 58 |
| Delta L* mark | 12 | 31 | 33 | 32 | 28 | 27 | 29 | 5 | 8 |
| Average % reflection mark (front side) | 6.9 | 13.4 | 14.0 | 14.3 | 12.6 | 13.1 | 14.2 | 34.5 | 32.5 |
| Average % reflection mark (rear side) | 3.0 | 1.5 | 1.5 | 1.6 | 1.8 | 2.1 | 2.2 | 26.5 | 20.9 |
| Delta % reflection mark | 3.9 | 11.9 | 12.5 | 12.7 | 10.8 | 11 | 12 | 8 | 11.6 |
| 355 nm laser beam marking (85% power) | | | | | | | | | |
| Contrast front | — | 89 | 91 | 92 | 96 | 96 | 95 | 175 | 176 |
| Contrast back | — | 24 | 15 | 20 | 34 | 34 | 34 | 151 | 134 |
| Delta contrast | — | 65 | 76 | 73 | 63 | 62 | 61 | 24 | 42 |
| 355 nm laser beam marking (75% power) | | | | | | | | | |
| Contrast front | — | 74 | 88 | 89 | 54 | 58 | 73 | 176 | 178 |
| Contrast back | — | 15 | 21 | 22 | 27 | 22 | 25 | 148 | 134 |
| Delta contrast | — | 60 | 67 | 67 | 28 | 36 | 48 | 28 | 44 |

Figure 9:
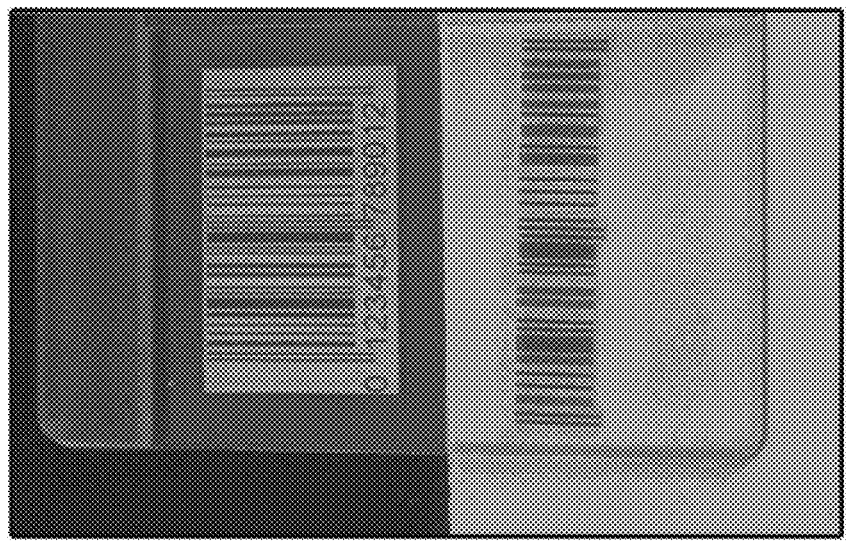
FIG. 9 is a photographic image of Sample 35 showing a light mark on a RAL 9010-GL background, created using a laser beam having a wavelength less than 500 nanometers and a dark mark on a RAL 9005-GL background, created using a laser beam having a wavelength greater than 500 nanometers.

FIG. 9 is a photographic image of Sample 35 showing a light mark on a RAL 9010-GL background, where the mark was created using a laser beam having a wavelength of less than 500 nm and a dark mark on a RAL 9005-GL background, created using a laser beam having a wavelength of 1064 nm.

Example 3

In this example, Samples 13, 25, 30, 32, 34, and 35 were tested for profile height and compared to the profile height of C1 to C5. The average profile of the mark was measured in micrometers. As can be seen in Table 12, the average profile of the marks generated from treating thermoplastics with laser light having a wavelength of less than 500 nm was surprisingly low with lightest colored, most reflective marks exhibiting profiles less than 30 micrometers. The profiles of the dark, carbonized marks of C1 and C2 are much higher. In C3 to C5, where a foaming type process beings to take effect and the mark becomes a brown color from the front, (but is much darker when viewed from the rear side due to contribution from the carbonization process), the profile is more than double compared with laser light having a wavelength of less than 500 nm.

The profile is lower when such a light mark is not required and can be rendered to be less than 5 micrometers to generate a watermark. Watermarks that are visible only under certain angles can be achieved with profiles rendered to be less than 2 micrometers.

TABLE 12

355 nm laser beam marking

| Profile | Laser power | #13 | #25 | #30 | #32 | #34 | #35 |
|---|---|---|---|---|---|---|---|
| Average height of best contrast mark (micrometers) | 95% | 15.4 | 14.5 | 14.9 | 12.9 | 11.2 | 9.0 |
| | 85% | 14.9 | 13.3 | 18.9 | 14.1 | 11.2 | 11.1 |
| | 75% | 13.7 | 11.9 | 19.0 | 11.9 | 11.7 | 11.7 |

1064 nm laser beam marking

| Profile | Laser power | C. Ex. #1 | C. Ex. #2 | C. Ex. #3 | C-Ex. #4 | C. Ex. #5 | — |
|---|---|---|---|---|---|---|---|
| Average height of best contrast mark (micrometers) | 95% | 104.8 | 80.3 | 59.4 | 70.9 | 73.2 | — |

Example 4

Figure 10:
FIG. 10 is a photographic image of Sample 36 laser welded to Sample 40 using a laser beam having a wavelength greater than 800 nanometers where the left image is the laser mark on the lower part (Sample 40), while the right image is the laser mark on the upper part (Sample 36).

Tables 13 and 14 demonstrate the process whereby materials can be laser welded with laser light having a wavelength longer than 800 nm and both the upper and lower joined parts are laser inscribed with laser light lower than 800 nm, specifically, less than 500 nm FIG. 10 is a photographic image of Sample 36 laser welded to Sample 40 using a laser beam having a wavelength of 960 nm. The samples have been laser marked with a laser beam having a wavelength of 355 nm. The image on the left is the laser on the lower part (Sample 40), while the image on the right is the laser mark on the upper part (Sample 36).

TABLE 13

| Material | 36 | 37 | 38 | 39 | 40 |
|---|---|---|---|---|---|
| PC1 | 99.37 | 97.86 | 96.38 | 97.94 | 97.79 |
| Loxiol EP8578 | 0.4 | 0.4 | 0.4 | 0.3 | 0.4 |
| AO1076 | 0.05 | 0.05 | 0.05 | 0.036 | 0.05 |
| AO1076 | | | | 0.02 | |
| UVA 5411 | 0.15 | 0.15 | 0.15 | 0.3 | 0.25 |
| LaB$_6$ MB in PC | | 1.5 | 1.5 | 1.4 | 0.75 |
| CTO MB in PC | | | | | 0.75 |
| Pigment Black 7 | | | | 0.0007 | 0.003 |
| Solvent Red 135 | | 0.021 | 0.5 | | |
| Solvent Yellow 98 | | 0.01 | | | |
| Vat Red 41 | | | 0.006 | | |
| TiO$_2$ | | | | 0.65 | |
| Solvent Yellow 163 | | | 0.37 | | 0.002 |
| Pigment Yellow 138 | | | | | 0.01 |
| Pigment Blue 60 | 0.0109 | | | | |
| Solvent violet 36 | 0.0153 | | | | |
| Total | 100 | 100 | 100 | 100 | 100 |

TABLE 13-continued

| Material | 36 | 37 | 38 | 39 | 40 |
|---|---|---|---|---|---|
| Laser absorbing > 800 nm | No | Yes | Yes | Yes | Yes |
| Laser absorbing < 500 nm | Yes | Yes | Yes | Yes | Yes |
| Laser welding geometry. Upper (U: laser transparent) or lower part (L: laser absorbing) | U | L | L | L | L |
| Part marked with 355 nm laser beam | Yes | Yes | Yes | Yes | Yes |

TABLE 14

| Material | 41 | 42 | 43 | 44 |
|---|---|---|---|---|
| PC1 | 37.95 | 37.60 | 33.90 | 33.96 |
| PC2 | 38.26 | 38.31 | | |
| PC3 | | | 40.00 | 40.00 |
| PCTG | | | 24.78 | 24.78 |
| PETS | 0.30 | 0.30 | 0.30 | 0.30 |
| Phosphonite PEPQ | | | 0.09 | 0.09 |
| PC5 | 22.20 | 22.20 | | |
| KSS | 0.30 | 0.30 | | |
| PTFE & T-SAN | 0.30 | 0.30 | | |
| Antioxidant | 0.09 | 0.09 | | |
| Phosporic Acid solution | | | 0.05 | 0.05 |
| Styrene-acrylate-epoxy oligomer | | | 0.25 | 0.25 |
| UVA 5411 | | | 0.25 | 0.25 |
| UVA 234 | 0.30 | 0.30 | | |
| AO1010 | | | 0.12 | 0.12 |
| Solvent Green 3 | | | 0.13 | |
| Solvent Red 135 | | | 0.13 | |
| Pigment Black 7 | 0.30 | | | 0.20 |
| Solvent violet 36 | | 0.30 | | |
| Solvent Blue 104 | | 0.30 | | |
| Total | 100 | 100 | 100 | 100 |
| Laser absorbing > 800 nm | Yes | No | No | Yes |
| Laser absorbing < 500 nm | Yes | Yes | Yes | Yes |
| Laser welding geometry. Upper (U: laser transparent) or lower part (L: laser absorbing) | L | U | U | L |
| Part marked with 355 nm laser beam | Yes | Yes | Yes | Yes |

Example 5

Tables 15 to 18 demonstrate that colorants generally used to modulate the visible color of compositions can themselves contribute to the interaction of the compositions with laser light having a wavelength of less than 500 nm to give light colored marks. Achieving a light colored mark on a transparent or amorphous material (essentially non-reflecting) offers the possibility to tune the substrate color in a traditional manner. The addition of absorbing additives including, but not limited to, hydroxybenzophenones, hydroxybenzotriazoles, hydroxybenzotriazines, cyanoacrylates, oxanilides, benzoxazinones, benzylidene malonate type UV stabilizers (e.g., Samples 46, 48, 50, 52, and 54) allows the color of the laser mark to be modified. The substrate color and the color of the mark can be determined by the choice of colorant and surprisingly, can be further manipulated by the addition of an organic additive, including carbon black (compare e.g., Samples 61 and 63 with Samples 62 and 64, respectively), capable of strongly absorbing light at wavelengths less than or equal to 500 nm

TABLE 15

| Material | 45 | 46 | 47 | 48 |
|---|---|---|---|---|
| PC1 | 99.45 | 99.2 | 99.485 | 99.235 |
| Antioxidant | 0.05 | 0.05 | 0.05 | 0.05 |
| PETS | 0.3 | 0.3 | 0.3 | 0.3 |
| UVA 5411 |  | 0.25 |  | 0.25 |
| Solvent Green 3 | 0.1 | 0.1 |  |  |
| Solvent Red 135 | 0.1 | 0.1 |  |  |
| Pigment Blue 15:4 |  |  | 0.11 | 0.11 |
| Macrolex Violet 3R |  |  | 0.055 | 0.055 |
| Total | 100 | 100 | 100 | 100 |

TABLE 15-continued

| Material | 45 | 46 | 47 | 48 |
|---|---|---|---|---|
| Absorption at 360 nm (%) | 1 | 1 | 1 | 1 |
| Average reflection (360-700 nm) substrate (%) | 0.0 | 0.0 | 0.1 | 0.0 |
| 355 nm laser beam marking (95% power) | | | | |
| L* of substrate (reflection mode) | 2 | 1 | 6 | 6 |
| a* of substrate | 1.1 | 1.0 | 15.2 | 15.1 |
| b* of substrate | 0.7 | 0.5 | -13.8 | -13.7 |
| L* of selected marks | 44 | 49 | 45 | 53 |
| a* | -0.5 | -0.5 | 1 | 0.4 |
| b* | 0.5 | -0.4 | 6.4 | 6.2 |
| Delta L* (mark – substrate) | 42 | 48 | 39 | 47 |

TABLE 16

| Material | 49 | 50 | 51 | 52 | 53 | 54 |
|---|---|---|---|---|---|---|
| PC1 | 99.553 | 99.303 | 99.5381 | 99.2881 | 99.48822 | 99.23822 |
| Antioxidant | 0.05 | 0.05 | 0.05 | 0.05 | 0.05 | 0.05 |
| PETS | 0.3 | 0.3 | 0.3 | 0.3 | 0.3 | 0.3 |
| UVA 5411 |  | 0.25 |  | 0.25 |  | 0.25 |
| Solvent Green 3 |  |  | 0.0308 | 0.0308 | 0.0462 | 0.0462 |
| Solvent Red 135 | 0.066 | 0.066 |  |  |  |  |
| Solvent Blue 104 |  |  | 0.0001 | 0.0001 | 0.00015 | 0.00015 |
| Solvent Yellow 93 |  |  | 0.0508 | 0.0508 | 0.0702 | 0.0702 |
| Solvent Red 52 |  |  | 0.0289 | 0.0289 | 0.0433 | 0.0433 |
| Pigment Black 7 | 0.005 | 0.005 | 0.0013 | 0.0013 | 0.00193 | 0.00193 |
| Pigment Blue 15:4 |  |  |  |  |  |  |
| Macrolex Violet 3R | 0.026 | 0.026 |  |  |  |  |
| Total | 100 | 100 | 100 | 100 | 100 | 100 |
| L* of substrate (reflection mode) | 3 | 3 | 1 | 1 | 1 | 1 |
| a* of substrate | 4.5 | 4.4 | 0.4 | 0.1 | 0.5 | 0.1 |
| b* of substrate | 0.9 | 0.9 | 0.3 | 0.1 | 0.2 | 0.0 |
| Average % reflection substrate (360-700 nm) | 0.2 | 0.2 | 0.0 | 0.0 | 0.1 | 0.0 |
| 355 nm laser beam marking (95% power) | | | | | | |
| L* of selected marks | 49 | 57 | 54 | 56 | 56 | 55 |
| a* | 3.6 | 3.4 | 0.9 | -0.3 | 7 | -0.3 |
| b* | 8 | 5.5 | 7.2 | 2.4 | 7.8 | 2.7 |
| Delta L* (mark – substrate) | 46 | 54 | 53 | 55 | 55 | 54 |

TABLE 17

| Material | 55 | 56 | 57 | 58 | 59 | 60 |
|---|---|---|---|---|---|---|
| PC8 | 82.8 | 82.8 | 82.8 | 82.8 | 82.8 | 82.8 |
| AO1076 | 0.06 | 0.06 | 0.06 | 0.06 | 0.06 | 0.06 |
| PC2 | 6 | 6 | 6 | 6 | 6 | 6 |
| UVA 5411 | 0.2 | 0.2 | 0.2 | 0.2 | 0.2 | 0.2 |
| 9105 | 10.69 | 10.69 | 10.658 | 10.775 | 10.776 | 10.848 |
| Solvent Green 3 | 0.125 |  |  |  |  |  |
| Solvent Red 135 | 0.125 |  | 0.18 |  | 0.018 | 0.009 |
| Solvent violet 36 |  | 0.25 | 0.09 | 0.055 | 0.075 | 0.065 |
| Pigment Yellow 138 |  |  | 0.012 |  |  |  |
| Pigment Blue 15:4 |  |  |  | 0.11 |  |  |
| Solvent Violet 13 |  |  |  |  | 0.071 |  |
| Copper Phthalocyanine Pigment Blue 15:1 |  |  |  |  |  | 0.018 |
| Total | 100 | 100 | 100 | 100 | 100 | 100 |
| L* of substrate (reflection mode) | 4 | 3 | 7 | 6 | 5 | 3 |
| a* of substrate | 0.7 | 0.4 | 2.0 | 13.9 | 0.8 | 1.1 |
| b* of substrate | -1.5 | -2.7 | -1.5 | -14.4 | -3.1 | -3.1 |
| Average % reflection substrate (360-700 nm) | 0.5 | 0.6 | 1.1 | 1.3 | 0.5 | 1.9 |

TABLE 17-continued

| Material | 55 | 56 | 57 | 58 | 59 | 60 |
|---|---|---|---|---|---|---|
| 355 nm laser beam marking (95% power) | | | | | | |
| L* of selected marks | 50 | 47 | 47 | 55 | 50 | 54 |
| a* | −0.7 | 2.9 | 3.3 | 0.7 | 1.7 | 0.6 |
| b* | 0.2 | −3.3 | 0.6 | 5.6 | −2.3 | −0.8 |
| Delta L* (mark − substrate) | 46 | 44 | 40 | 49 | 45 | 50 |
| Delta a* | −1.4 | 2.5 | 1.3 | −13.2 | 0.9 | −0.5 |
| Delta b* | 1.7 | −0.6 | 2.1 | 20.0 | 0.8 | 2.3 |
| Average % reflection mark | 18.1 | 17.7 | 17.3 | 22.2 | 19.7 | 21.8 |
| Delta % reflection mark | 17.6 | 17.1 | 16.1 | 20.8 | 18.8 | 21.3 |

TABLE 18

| Material | 61 | 62 | 63 | 64 |
|---|---|---|---|---|
| PC8 | 82.8 | 82.8 | 82.8 | 82.8 |
| AO1076 | 0.06 | 0.06 | 0.06 | 0.06 |
| PC2 | 6 | 6 | 6 | 6 |
| UVA 5411 | 0.2 | 0.2 | 0.2 | 0.2 |
| 9105 | 10.848 | 10.838 | 10.598 | 10.588 |
| Solvent Red 135 | 0.066 | 0.066 | | |
| Solvent violet 36 | 0.026 | 0.026 | | |
| Pigment Yellow 138 | | | 0.3 | 0.3 |
| Pigment Black 7 | | 0.01 | | 0.01 |
| Copper Phthalocyanine Pigment Blue 15:4 | | | 0.026 | 0.026 |
| Pigment Green 7 | | | 0.016 | 0.016 |
| Total | 100 | 100 | 100 | 100 |
| L* of substrate (reflection mode) | 12 | 4 | 20 | 15 |
| a* of substrate | 3.2 | 1.9 | −22.2 | −5.0 |
| b* of substrate | −1.0 | −1.8 | 12.5 | 4.6 |
| Average % reflection substrate (360-700 nm) | 1.9 | 0.5 | 2.2 | 1.8 |
| 355 nm laser beam marking (95% power) | | | | |
| L* of selected mark | 54 | 59 | 61 | 57 |
| a* | 2.1 | 2.6 | −6.1 | −2.9 |
| b* | 1.3 | 5.8 | 16.9 | 14.2 |
| Delta L* (mark − substrate) | 42 | 55 | 41 | 42 |
| Delta a* | −1.0 | 0.7 | 16.1 | 2.1 |
| Delta b* | 2.2 | 7.6 | 4.3 | 9.6 |
| Average % reflection mark | 22.4 | 26.1 | 25.9 | 23.0 |
| Delta % reflection mark | 20.5 | 25.6 | 23.7 | 21.3 |

Surprisingly it was discovered that laser light with wavelengths less than or equal to 500 nm can interact with the compositions disclosed herein by a thermal mechanism to give light colored markings. For example, the light colored markings can be white (e.g., white, off white, bright white ivory, snow, pearl, antique white, chalk, milk white, lily, smoke, seashell, old lace, cream, linen, ghost white, beige, cornsilk, alabaster, paper, whitewash, etc.). By modulating the compositions and the method of marking, the inscriptions can be made visible to nearly visible. The combination of the method and compositions can allow text, logos, two dimensional-data matrices, and images to be inscribed in compositions such as polycarbonate, bisphenol-A polycarbonate based copolymers, polyesters, PMMA, polystyrene, polyamides, and combinations comprising at least one of the foregoing. The markings (e.g., dots) can be assembled to generate two dimensional data matrices and images of varying size and clarity by manipulating the laser process. Applications can include identification cards (e.g., license, passport, etc.). Additionally, semi-covert inscriptions can be customized to provide logos, text, and machine readable data on various components made from the compositions described herein. Applications can include data and images on identification cards, security and authentication data on phones, computers, and automotive glazing, and logs on televisions, etc.

The following examples of compositions for UV active laser inscriptions were prepared using the materials of Table 2. The thermoplastic test specimens were prepared by melt extrusion on a Werner & Pfleiderer 25 mm twin screw extruder, using a nominal melt temperature of 290 to 310° C., 25 inches (635 mm) of mercury vacuum and 450 rpm. The extrudate was pelletized and dried at 110° C. for 3 hours. Test specimens were produced from the dried pellets and were injection molded at nominal temperatures of 290 to 320° C.

A Trumark 6330 laser (355 nm), which has a power output of 2 Watts (W), was used to inscribe the test pieces with a processing matrix consisting of a range of laser conditions such as frequency of 20 to 40 kiloHertz (kHz), speed of 600 to 1800 millimeters per second (mm/sec), and a fill factor of 0.03 to 0.45 mm, i.e., the spacing between adjacent lines of laser dots. The settings were not further optimized and merely indicate the ability to control the intensity of the visible legibility and UV activity by modifying the laser parameters.

A transparent thermoplastic BPA based co-polymer composition comprised of PPPBP/BPA copolycarbonate (Ex. No. 66 of Table 19) interacts with UV laser light to give UV active laser mark while Sample No. 65 exhibited no UV activity (fluorescence) in the area treated with the laser. The addition of UV absorbing additive or colorant to the formulation of sample No. 65 to give Sample No. 67 and other polycarbonate or BPA based copolymers based compositions yields UV active laser inscribed microdots. The visibility or legibility of the microdot arrangements can be tuned from clearly legible to semi-covert or barely visible by modulating the level of interaction and hence the degree of scattering by the physical size/shape of the resulting microdot (FIG. 4).

Figure 11:
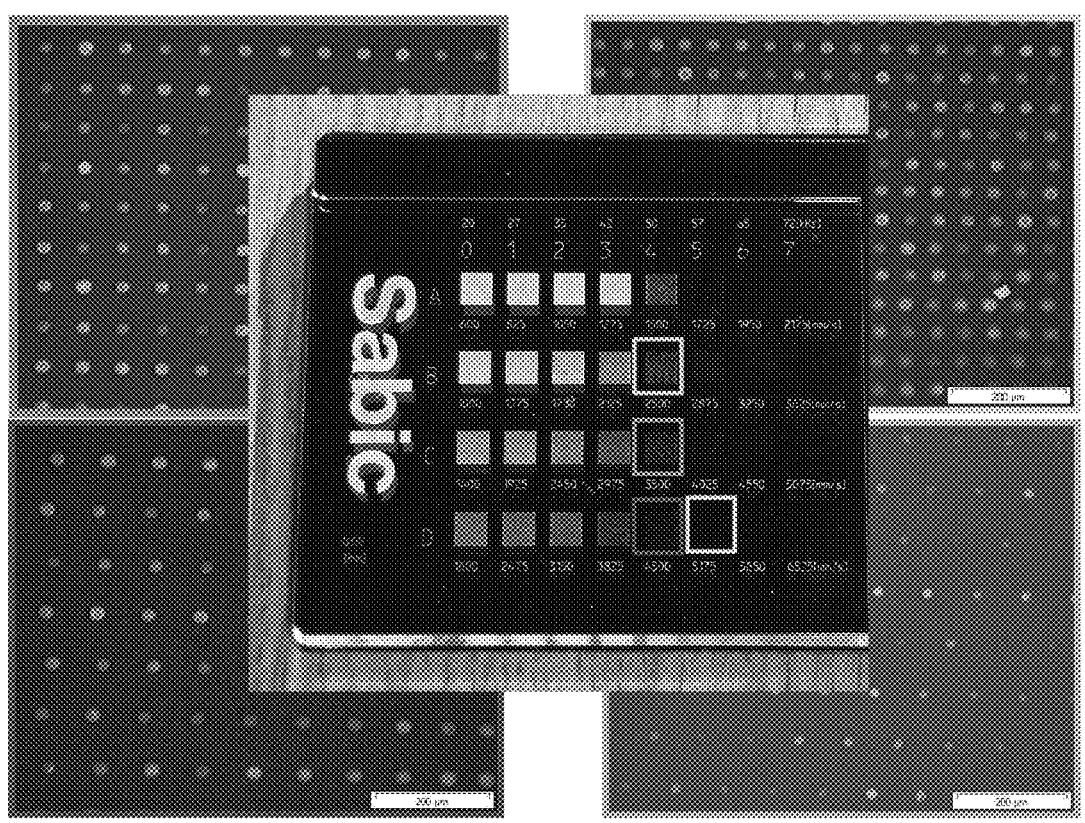
FIG. 11 is a photographic image of a laser inscribed 2.5 mm thick sample of sample No. 69 of Table 19 placed on a black background to illustrate color and contrast of mark.
Figure 14:
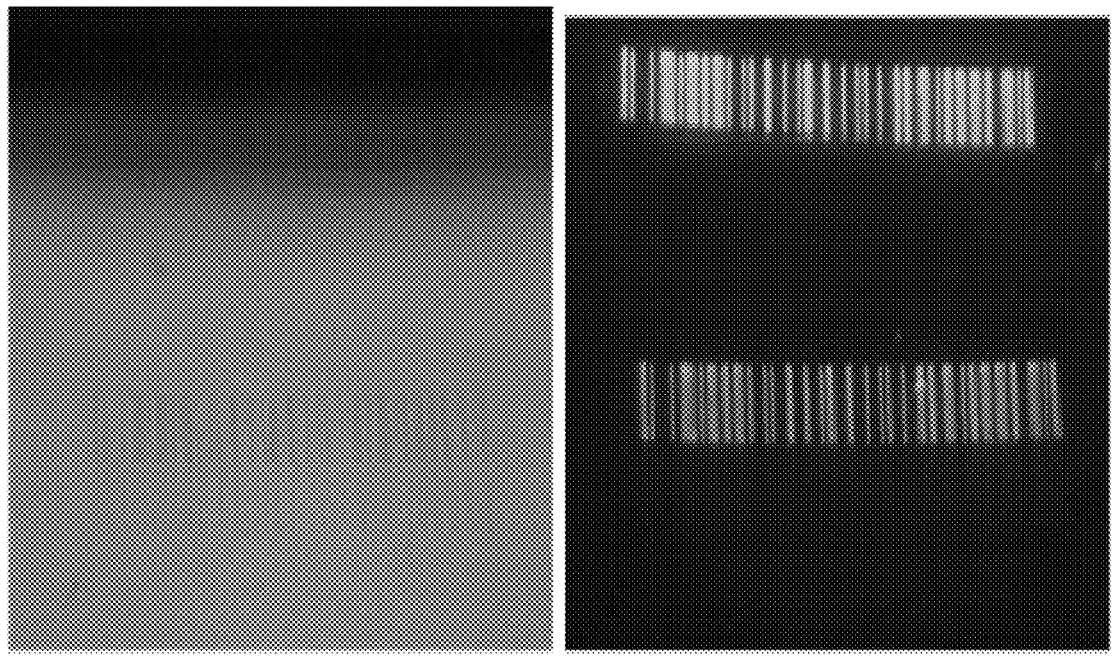
FIG. 14 is a photographic image of laser marked sample 70 on a white background viewed under standard lighting (left) and black light (right).

FIG. 11 illustrates a laser inscribed 2.5 mm thick sample of 69 of Table 19 placed on a black background to illustrate color and contrast of mark. The visibility of the array of microdots varies from clearly visible to semi-covert or barely visible depending on the laser parameters & process. The insets are the indicated regions viewed under UV illumination under an optical microscope. As shown in FIG. 11, the laser inscribed microdots are visible under UV illumination (i.e., UV active), and, surprisingly, it was found that the intensity of the UV response of the laser-inscribed microdots could be modulated by changing the laser parameters such as power, frequency, speed, line spacing, focus. FIG. 14 shows a laser inscribed barcode on example 70 from Table 19 viewed under a black light on a white background.

The white mark is visible at an angle, but under UV illumination the laser treated area is directly visible.

In contrast, compositions such as PMMA, polystyrene and polyamide (Sample Nos. 71-73 of Table 21) also give visible microdots upon addition of an absorbing additive or colorant due to the scattering of the visible light by the microdots, but they are not UV active

TABLE 19

Transparent thermoplastic BPA & BPA based co-polymer compositions

| | Sample No. | | | | | |
|---|---|---|---|---|---|---|
| | 65 | 66 | 67 | 68 | 69 | 70 |
| PC1 | 99.65 | 17.58 | 99.4 | | | 16.1 |
| PC7 | | 82 | | | | |
| PETS | 0.3 | 0.3 | 0.3 | 0.4 | 0.4 | |
| AO1076 (205) Irgafos 168 | 0.05 | 0.08 | 0.05 | 0.05 | 0.05 | 0.06 |
| AO1076 | | 0.04 | | | | |
| UVA 5411 | | | 0.25 | | 0.3 | 0.3 |
| PC6 | | | | 99.55 | 99.25 | |
| PC8 | | | | | | 83 |
| Pigment Blue 60 | | | | 0.0109 | 0.0109 | 0.0109 |
| Solvent violet 36 | | | | 0.0153 | 0.0153 | 0.0153 |
| Sum | 100 | 100 | 100 | 100 | 100 | 100 |
| Visible laser inscription | NO | YES | YES | NO | YES | YES |
| UV active laser inscribed microdots | NO | YES | YES | NO | YES | YES |
| % Transmission at 355 nm | 78 | 58 | <2 | 77 | <2 | <2 |

TABLE 20

Transparent thermoplastic compositions without BPA based (co)polymers

| Sample No. | 71 | 72 | 73 |
|---|---|---|---|
| Grialamid TR55 | 90.6 | | |
| PMMA | | 90.6 | |
| Polystyrene | | | 90.6 |
| CYASORB UV-3638 (2309) | 0.4 | 0.4 | 0.4 |
| Sum | 100 | 100 | 100 |
| Visible laser inscription | YES | YES | YES |
| UV active laser inscribed microdots | NO | NO | NO |
| % Transmission at 355 nm | 9 | 3 | 2 |

The following examples were prepared using a laser having a wavelength of 355 nm and z-axis offset of 8 mm above the surface. A Trumark 6330 laser (355 nm), which has a power output of 2 Watts (W) was used to inscribe the test pieces with a processing matrix consisting of a range of laser conditions such as frequency of 27 to 32 kiloHertz (kHz), velocity of 834 to 975 millimeters per second (mm/sec), and a line spacing of 0.03 mm, margin spacing of 0 mm, hatching angle of 90 degrees, and 1 hatching. The power setting was 95% unless otherwise stated.

TABLE 21

| Item Code | Item Description | Unit | A | B | C | D | E | F |
|---|---|---|---|---|---|---|---|---|
| 205 | Irgafos 168 | % | 0.06 | 0.06 | 0.06 | 0.06 | 0.06 | 0.06 |
| 235 | UVA 5411 | % | | | | | 0.3 | |
| 3990 | PC masterbach lanthanum hexaboride | % | | 2 | | | | |
| 07183 | 0.1% pigment black 7 in PC | % | | | 0.79 | 0.75 | | |
| 9175 | PC2 | % | 34.94 | 32.94 | 34.15 | 34.19 | 6.05 | 19.94 |

TABLE 21-continued

| Item Code | Item Description | Unit | A | B | C | D | E | F |
|---|---|---|---|---|---|---|---|---|
| 9135 | PC10 | % | 65 | 65 | 65 | 65 | | 65 |
| 669 | PC8 | % | | | | | 82.59 | |
| 9105 | PC1 | % | | | | | 11 | |
| | TiO2 | % | | | | | | 15 |
| | | | 100 | 100 | 100 | 100 | 100 | 100 |
| | Thickness | mm | 100 | 50 | 100 | 50 | 200 | 100 |

The various examples were constructed with the materials listed in Table 21. The letters A-F represent a material used as a layer in the multilayered article. In the following examples, the layers were joined together through a lamination process.

Sample No. 75 (monolayer A) exhibited little interaction with laser light having a wavelength of 355 nm. However As shown in Table 22, However the addition of 10 ppm or less of carbon black to sample No. 75 to give sample No. 74, a dark black mark is achieved using a laser having a wavelength of 355 nm and z-axis offset of 8 mm above the surface of sample No. 74 (of Table 21), a composition with weak UVA. The inscription is particularly darker when the mark is viewed and measured on the opposite to the laser interaction (Bottom). Sample 75 comprises a polycarbonate layer (material A of Table 21) without UVA (UV transparent) laminated to the identical construction of sample No. 74. As illustrated in Table 22, the L* for Sample 75 was lower on the side with laser interaction, indicating that a darker mark was achieved when a UV transparent layer is laminated on top of a UVA layer. Accordingly, a multilayer construct of visibly transparent sections comprised of at least two layers, one of which has little UVA and exhibits minimal interaction with laser light less than 500 nm (UV transparent), adjoined to another layer with weak UVA gives a deep, dark laser mark. As used herein, a UV transparent layer is a layer that has a transmission of about 90% or greater. A white mark can be generated by laminating another visibly transparent film with strong UVA below the section with weak UVA. Thus, both black and white marks can be generated in the transparent article regardless of the substrate composition or sensitivity to UV light. For example, a black and white image can be achieved by treating a construct exemplified by Sample 76 the section with strong UVA with a laser light less than 500 nm to produce the light colored mark while directing the laser towards the weak UVA section, optionally covered with a UV transparent section.

TABLE 22

| | Sample No. | | | |
|---|---|---|---|---|
| | 74 Top | #74 Bottom | #75 | #76 |
| Spec Inc. (mark) | | | | |
| L* | 39.7 | 28.9 | 78.3 | 29.5 |
| a* | 0.5 | 0.4 | -0.2 | 0.4 |
| b* | 3.5 | 0.6 | 3.1 | 1.2 |

TABLE 22-continued

| | Sample No. | | | |
|---|---|---|---|---|
| | 74 Top | #74 Bottom | #75 | #76 |
| Spec Exc. (mark) | | | | |
| L* | 37.5 | 11.2 | 76.2 | 13.7 |
| a* | 0.5 | 0.9 | -0.2 | 0.8 |
| b* | 3.9 | 2.4 | 3.1 | 2.7 |
| Construct | | | A | A |
| | C | C | | C |
| | | | | E |

Sample No. 77 of Table 23 demonstrates that a thin film with strong UVA (material E) substantially protects a substrate containing a high loading of titanium dioxide (material F) that would normally exhibit strong interaction when exposed directly with laser light less than 500 nm

TABLE 23

| Sample | 77 |
|---|---|
| Substrate color Spec Inc. | |
| L* | 91.1 |
| a* | -0.7 |
| b* | 0.3 |
| Spec Exc. (mark) | |
| L* | 88.9 |
| a* | -0.7 |
| b* | 0.3 |
| Construct | E |
| | F |

Sample Nos. 78-84 of Table 24 demonstrate various constructions comprising several combinations and arrangements of layers or sections with tuned UV absorption/transparency. The color of the combinations in Table 25 indicates that these films or sections have little impact on the color of the assembly. Each construction exhibits exceptionally dark marks on a white substrate (material F) with laser light having a wavelength less than 500 nm.

TABLE 25

| | Sample | | | | | | |
|---|---|---|---|---|---|---|---|
| | 78 | 79 | 80 | 81 | 82 | 83 | 84 |
| delamination | Yes | Yes | No | No | Yes | No | No |
| Substrate color Spec Inc. | | | | | | | |
| L* | 91.4 | 91.5 | 91.6 | 91.6 | 91.5 | 91.0 | 90.8 |
| a* | −0.6 | −0.8 | −0.6 | −0.6 | −0.6 | −0.4 | −0.4 |
| b* | −0.4 | −0.5 | −0.7 | −0.8 | −0.4 | −0.5 | −0.5 |
| Spec Inc. (mark) | | | | | | | |
| L* | 31.5 | 29.7 | 30.6 | 29.5 | 31.2 | 31.4 | 31.1 |
| a* | 0.2 | 0.4 | 0.4 | 0.6 | 0.3 | 0.3 | 0.4 |
| b* | 1.1 | 1.8 | 1.3 | 2.7 | 1.3 | 1.0 | 1.4 |
| Spec Exc. (mark) | | | | | | | |
| L* | 14.6 | 14.9 | 15.8 | 17.4 | 14.9 | 17.0 | 16.7 |
| a* | 0.6 | 0.7 | 0.8 | 0.8 | 0.6 | 0.5 | 0.6 |
| b* | 3.2 | 3.3 | 3.4 | 3.6 | 3.3 | 2.7 | 3.2 |
| Construct | A (x1) | A (x1) | A (x3) | A (x4) | A (x1) | A (x3) | A (x4) |
| | C | B | B | B | D | D | D |
| | E | E | E | E | E | E | E |
| | F | F | F | F | F | F | F |

Figure 12:
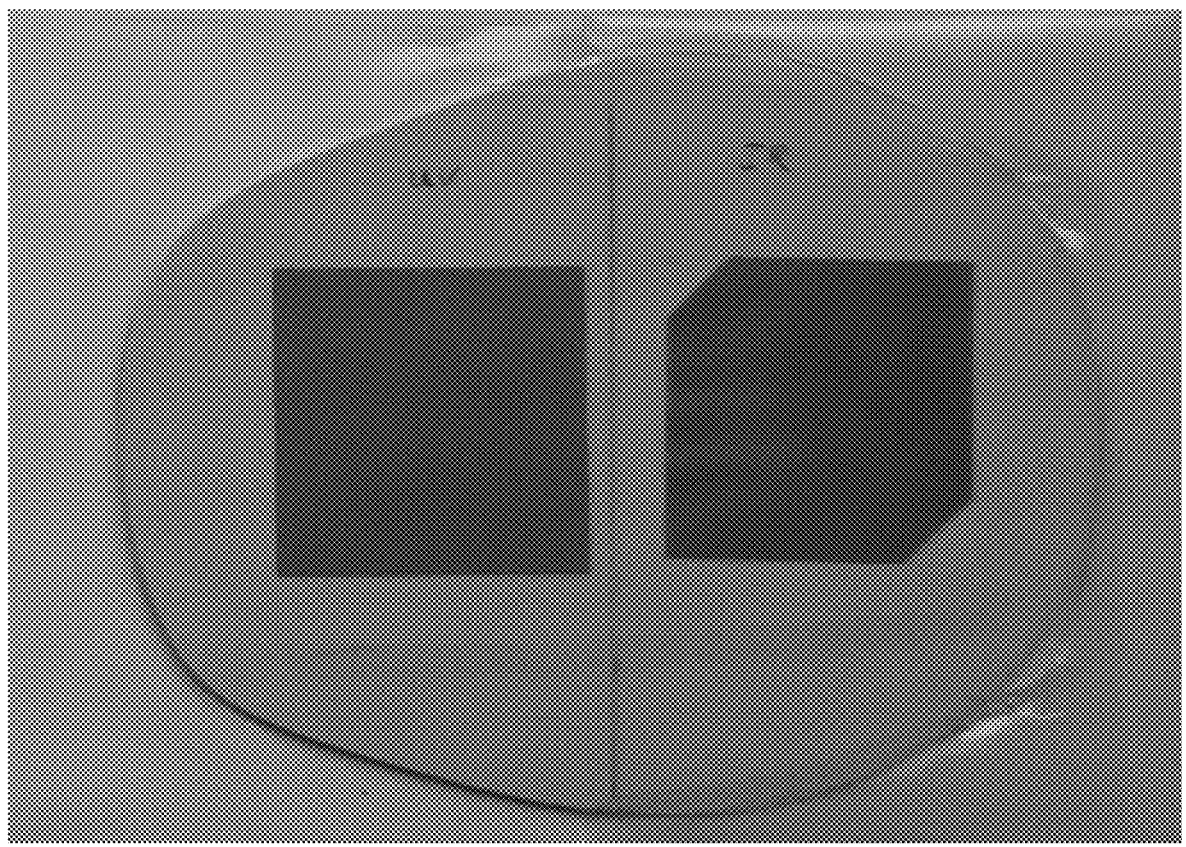
FIG. 12 is a photographic image of sample No. 80.
Figure 13:
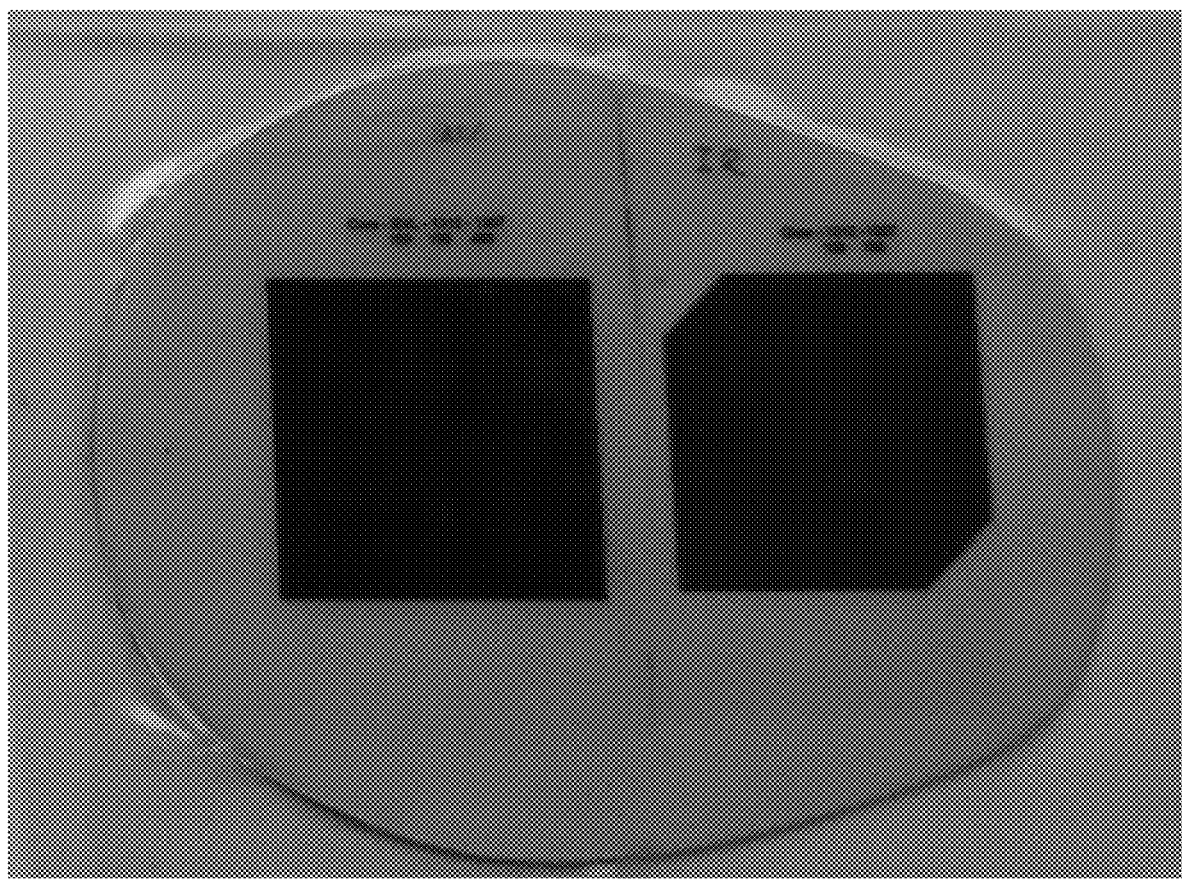
FIG. 13 is a photographic image of sample No. 80.

The colored substrates listed in Table 26 were subjected to IR laser (1064 nm) and an UV laser (355 nm). Marking the substrate with the IR laser resulted in browning, greying, and barely visible marks. The colored substrates were covered with additional layers A (UV transparent), C (weak UVA), and E (strong UVA). The combination and arrangement of the additional layers or sections with tuned UV absorption/transparency gave exceptionally dark marks with neutral a*, b* tones (close to zero) with laser light having a wavelength less than 500 nm. The consistency of the mark across the range of colors is evidenced by the narrow spread of L*, a* and b* values listed in Table 27 and Table 28. As shown in FIGS. 12 and 13, a darker mark was formed in Sample No. 80 when a transparent layer was employed. Table 27 illustrates the results of the various constructs and laser wavelengths with Spectralon Included. Table 28 illustrates the results of the various constructs and laser wavelengths with Spectralon Excluded. As used in Tables 27 and 28, "Rofin" refers to the "Rofin Powerline E" laser with a track width of 0.084 mm, 27 ampere, a velocity of 300 mm/s, a pulse frequency of 10000 Hz, line spacing 0.084 mm, margin spacing 0 mm, hatching angle of 45 degrees and 1 hatch.

TABLE 26

| | red | pink | green | light green | blue | yellow |
|---|---|---|---|---|---|---|
| | | | Sample No. | | | |
| | 85 | 86 | 87 | 88 | 89 | 90 |
| | 83 | 83 | 83 | 83 | 83 | 83 |
| | 15.339 | 16.308 | 14.8774 | 15.3957 | 15.3833 | 15.086 |
| | 0.06 | 0.06 | 0.06 | 0.06 | 0.06 | 0.06 |
| pigment black 7 | | | 0.0003 | 0.001 | | |
| TiO2 | 1.5 | 0.5 | 1.9 | 1.5 | 1.5 | 1.8 |
| Solvent Blue 104 | | | | | 0.0017 | |
| Pigment Blue 15:4 | | | 0.009 | 0.0011 | 0.014 | |
| Solvent green 28 | | | | 0.0002 | | |
| Disperse Yellow 201 | | | 0.148 | 0.042 | | |
| Solvent Yellow 93 | | | 0.005 | | | 0.027 |
| Pigment Yellow 147 | | | | | | |
| Solvent Yellow 163 | | | | | 0.0005 | 0.027 |
| Disperse Orange 47 | 0.015 | 0.007 | | | | |
| Solvent Red 52 | | | 0.0003 | | 0.0005 | |
| Vat Red 41 | 0.05 | 0.05 | | | | |
| Solvent orange 63 | 0.036 | 0.06 | | | | |
| Solvent Red 207 | | 0.015 | | | | |
| OB | | | | | | 0.04 |
| Sum | 100 | 100 | 100 | 100 | 100 | 100 |

TABLE 27

| Spec Inc. | Sample | Construct | 85 | 86 | 87 | 88 | 89 | 90 | Max | Min | Spread |
|---|---|---|---|---|---|---|---|---|---|---|---|
| Substrate color | L* | | 60.3 | 71.3 | 80.5 | 88.4 | 77.1 | 90.6 | | | |
| | a* | | 61.9 | 58.6 | −37.4 | −24.9 | −22.8 | −0.8 | | | |
| | b* | | 27.9 | 29.2 | 53.7 | 51.4 | −22.3 | 39.4 | | | |
| | Color | | Red | Pink | Green | Light green | Blue | Yellow | | | |
| 1064 nm Laser mark color (mark) | L* | | 58.3 | 58.6 | 45.9 | 45.4 | 56.7 | 68.3 | 68.3 | 45.4 | 22.9 |
| | a* | | 57.9 | 35.4 | −7.2 | −4.2 | −9.7 | −2.2 | 57.9 | −9.7 | 67.5 |
| | b* | | 25.7 | 13.8 | 11.6 | 5.1 | −9.4 | 16.2 | 25.7 | −9.4 | 35.1 |
| | Color | | Red | Pink | Green | Light green | Blue | Yellow | | | |
| 355 nm Laser mark color (mark) | L* | | 52.3 | 54.8 | 55.2 | 57.0 | 56.4 | 55.4 | 57.0 | 52.3 | 4.7 |
| | a* | | 10.0 | 8.3 | −5.7 | −3.1 | −4.1 | −0.1 | 10.0 | −5.7 | 15.8 |
| | b* | | 9.1 | 8.8 | 16.9 | 12.5 | 2.9 | 8.5 | 16.9 | 2.9 | 14.0 |
| | Color | | Red | Pink | Green | Light green | Blue | Yellow | | | |
| 1064 nm Laser mark color (mark) | L* | | 40.4 | 37.4 | 34.4 | 36.6 | 37.1 | 44.3 | 44.3 | 34.4 | 9.9 |
| | a* | A | 27.8 | 15.1 | −3.1 | −1.8 | −4.2 | 0.6 | 27.8 | −4.2 | 32.0 |
| | b* | C | 11.6 | 7.3 | 7.0 | 6.9 | −0.9 | 10.8 | 11.6 | −0.9 | 12.5 |
| | Color | | Red | Pink | Green | Light green | Blue | Yellow | | | |
| 1064 nm (Rofin) (mark) | L* | | 29.7 | 28.9 | 27.8 | 28.4 | 28.5 | 28.9 | 29.7 | 27.8 | 1.8 |
| | a* | A | 5.8 | 2.1 | 0.2 | 0.2 | 0.1 | 0.6 | 5.8 | 0.1 | 5.7 |
| | b* | C | 2.6 | 1.4 | 1.2 | 1.0 | 0.8 | 2.1 | 2.6 | 0.8 | 1.8 |
| | Color | | Red | Pink | Green | Light green | Blue | Yellow | | | |
| 355 nm Laser mark color (mark) | L* | A (x3) | 31.5 | 32.0 | 31.8 | 32.6 | 33.2 | 32.6 | 33.2 | 31.5 | 1.8 |
| | a* | C | 1.6 | 1.4 | −0.2 | 0.2 | −0.2 | 0.4 | 1.6 | −0.2 | 1.8 |
| | b* | E | 1.1 | 1.3 | 1.5 | 1.6 | 1.1 | 1.6 | 1.6 | 1.1 | 0.5 |
| | Color | | Red | Pink | Green | Light green | Blue | Yellow | | | |

TABLE 28

| Spec Exc. | Sample | Construct | 85 | 86 | 87 | 88 | 89 | 90 | Max | Min | Spread |
|---|---|---|---|---|---|---|---|---|---|---|---|
| 1064 nm Laser mark color (mark) | L* | | 53.8 | 54.7 | 46.0 | 40.2 | 52.7 | 64.8 | 64.8 | 40.2 | 24.6 |
| | a* | | 63.3 | 40.0 | −7.3 | −5.3 | −11.1 | −2.3 | 63.3 | −11.1 | 74.5 |
| | b* | | 30.5 | 16.4 | 11.5 | 6.9 | −10.5 | 17.6 | 30.5 | −10.5 | 41.0 |
| | Color | | | | | | | | | | |
| 355 nm Laser mark color (mark) | L* | | 52.3 | 54.6 | 55.9 | 57.3 | 56.4 | 55.2 | 57.3 | 52.3 | 5.0 |
| | a* | | 10.3 | 8.6 | −6.1 | −3.2 | −4.2 | −0.1 | 10.3 | −6.1 | 16.4 |
| | b* | | 8.6 | 8.3 | 17.0 | 12.2 | 2.4 | 8.2 | 17.0 | 2.4 | 14.6 |
| | Color | | | | | | | | | | |
| 1064 nm Laser mark color (mark) | L* | | 32.4 | 27.6 | 34.6 | 26.5 | 26.7 | 37.1 | 37.1 | 26.5 | 10.6 |
| | a* | A | 36.3 | 22.0 | −3.2 | −2.9 | −6.5 | 0.8 | 36.3 | −6.5 | 42.8 |
| | b* | C | 17.6 | 12.3 | 7.3 | 12.6 | −1.1 | 15.1 | 17.6 | −1.1 | 18.7 |
| | Color | | | | | | | | | | |
| 1064 nm (Rofin) (mark) | L* | | 15.2 | 12.0 | 12.6 | 12.6 | 11.5 | 13.3 | 15.2 | 11.5 | 3.7 |
| | a* | A | 11.2 | 5.1 | 0.1 | 0.3 | 0.1 | 1.2 | 11.2 | 0.1 | 11.2 |
| | b* | C | 5.4 | 3.6 | 1.0 | 1.8 | 1.7 | 4.7 | 5.4 | 1.0 | 4.4 |
| | Color | | Red | Pink | Green | Light green | Blue | Yellow | | | |
| 355 nm Laser mark color (mark) | L* | A x 3 | 17.4 | 18.3 | 18.7 | 19.3 | 20.8 | 19.5 | 20.8 | 17.4 | 3.4 |
| | a* | C | 3.2 | 2.5 | −0.3 | 0.3 | −0.3 | 0.6 | 3.2 | −0.3 | 3.6 |
| | b* | E | 2.7 | 3.0 | 3.2 | 3.4 | 2.3 | 3.3 | 3.4 | 2.3 | 1.0 |
| | Color | | Red | Pink | Green | Light green | Blue | Yellow | | | |

TABLE 29

| Construction | Sample | L* | a* | b* | dL* | da* | db* | dE |
|---|---|---|---|---|---|---|---|---|
| Sample No. 65 PC | | 96.0 | 0.0 | 0.5 | | | | |
| Sample No. 65 & BR | 91 | 94.3 | 1.5 | 4.0 | −1.7 | 1.5 | 3.5 | 4.2 |
| Sample No. 65 & BR laser marked | | 77.3 | 10.8 | 8.7 | −17.0 | 9.4 | 4.7 | 20.0 |
| Sample No. 67 | | 95.3 | −0.2 | 0.1 | | | | |
| Sample No. 67 & BR | 92 | 94.1 | 0.7 | 1.6 | −1.2 | 0.8 | 1.5 | 2.1 |
| Sample No. 67 & UVA & BR laser marked | | 81.1 | 8.7 | 5.8 | −13.0 | 8.0 | 4.2 | 15.9 |
| Sample No. 65 & OB | 93 | 95.1 | −0.8 | −0.3 | −0.8 | −0.8 | −0.8 | 1.4 |
| Sample No. 65 & OB laser marked | | 88.5 | −4.1 | −6.0 | −6.6 | −3.3 | −5.7 | 9.3 |

Figure 15:
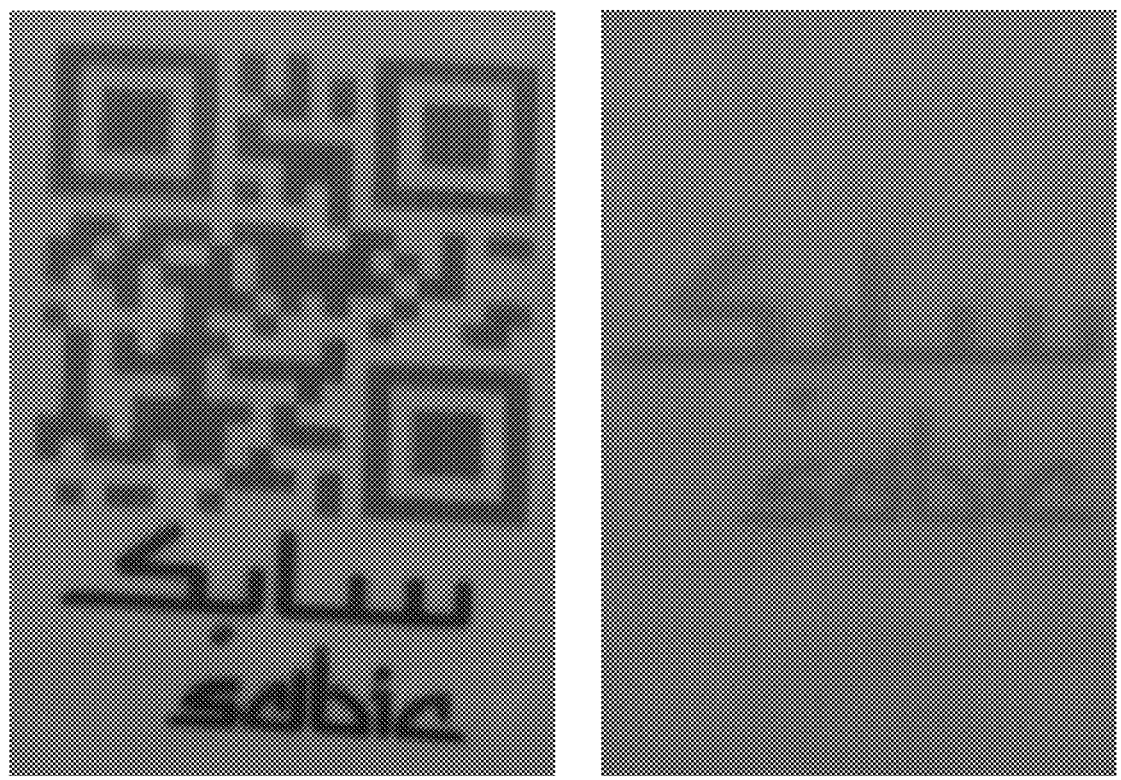
FIG. 15 is a photographic image of Samples 91 and 93 against a white background.

Table 29 lists various constructions illustrating the use of photochromic additives. BR and OB denote that the sample was impregnated with berry red or oxford blue (spirooxazine photochromic additives), respectively. FIG. 15 illustrates the use of photochromic additives in sample Nos. 91 (left) and 93 (right).

Set forth below are some embodiments of the methods and articles.

Embodiment 1

An article for laser marking comprising: a thermoplastic composition comprising a thermoplastic polymer, an active component comprising at least one of a polymeric unit and an additive, wherein the thermoplastic polymer has a visible transmission of greater than or equal to 80% according to ASTM D1003-00, Procedure A, using D65 illumination, 10 degrees observer, and thickness of 1 mm; a mark produced by chemical rearrangement of the active component generated by a laser of a first wavelength; wherein the mark exhibits at least one of: (i) a change in optical properties in the region 400 nm to 700 nm when exposed to light having a wavelength less than or equal to 500 nm; and (ii) a change in optical properties in the region of 400 nm to 700 nm when exposed to light having a wavelength greater than or equal to the first wavelength.

Embodiment 2

The article of Claim 1, wherein the mark exhibits a change in optical properties in the region 400 nm to 700 nm when exposed to light having a wavelength less than or equal to 400 nm.

Embodiment 3

The article of any of Claims 1 to 2, wherein the mark is visible when exposed to light having a wavelength of less than or equal to 400 nm.

Embodiment 4

The article of Claim 3, wherein the mark is only visible when exposed to light having a wavelength of less than or equal to 400 nm.

Embodiment 5

The article of any of Claims 1 to 4, wherein the thermoplastic composition comprises another additive comprising at least one of ultraviolet absorbing additive selected from hydroxybenzophenones, hydroxybenzotriazoles, hydroxybenzotriazines, cyanoacrylates, oxanilides, benzoxazinones, benzylidene malonates, hindered amine light stabilizers, nano-scale inorganics, and combinations comprising at least one of the foregoing.

Embodiment 6

The article of any of Claims 1-5, wherein the active component has ester groups of the formula

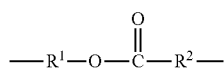

wherein at least 60 percent of the total number of $R^1$ groups contain aromatic moieties and the balance thereof are aliphatic, alicyclic, or aromatic, and $R^2$ groups can be oxygen, aliphatic, alicyclic, or aromatic, or contain aromatic moieties with the balance thereof being aliphatic, alicyclic, or aromatic.

Embodiment 7

The article of Claim 6, wherein the active component is a carbonate group, $R^2$ is oxygen derived.

Embodiment 8

The article of any of Claims 1-7, comprising the additive, wherein the additive is photochromic.

Embodiment 9

The article of any of Claims 1-8, comprising the additive, wherein the additive is spiropyran, spirooxazine, fulgide, diarylethene, spirodihydroindolizine, azo-compounds, and Schiff base family, benzo-family, naphthopyrans family, or a combination comprising at least one of the foregoing.

Embodiment 10

The article of any of Claims 1-9, wherein the thermoplastic polymer has less than or equal to 50% carbonate groups.

Embodiment 11

The article of any of Claims 1-9, wherein the thermoplastic polymer comprises polycarbonate, polyesters, polymethyl methacrylate, polystyrene, polybutylene terephthalate, polyolefins, polyamides, polyvinylchloride, polylactic acid, and combinations comprising at least one of the foregoing.

Embodiment 12

The article of any of Claims 1-11, wherein the thermoplastic polymer comprises a polycarbonate copolymer.

Embodiment 13

The article of any of Claims 1-12, wherein the polycarbonate copolymer is a polyester-carbonate copolymer.

Embodiment 14

The article of any of Claims 1-13, wherein the change in optical properties comprises a change in reflection.

Embodiment 15

The article of any of Claims 1-13, wherein the change in optical properties comprises a change in absorption.

Embodiment 16

The article of any of Claims 1-15, wherein the first wavelength is less than or equal to 500 nm.

Embodiment 17

The article of any of Claims 1-16, wherein the first wavelength is less than or equal to 400 nm.

Embodiment 18

A multilayered article for laser marking comprising: a first layer having a visible transmission of greater than or equal to 80% according to ASTM D1003-00, Procedure A, using D65 illumination, 10 degrees observer, at a thickness of the first layer in the multilayer article; a second layer having a visible transmission of greater than or equal to 80% according to ASTM D1003-00, Procedure A, using D65 illumination, 10 degrees observer, at a thickness of the second layer in the multilayer article, and wherein the second layer comprises a component that will form a laser mark with an L* of less than or equal to 40 as measured according to CIELAB 1976 (specular included), when exposed to a laser light of a wavelength of greater than 800 nm; a third layer reflective to laser light having a wavelength greater than 800 nm, wherein the third layer has a visible transmission of greater than or equal to 80% according to ASTM D1003-00, Procedure A, using D65 illumination, 10 degrees observer, at a thickness of the third layer in the multilayer article; and optionally a substrate; wherein the article comprises a laser mark having an L* of less than or equal to 40 as measured according to CIELAB 1976 (specular included).

Embodiment 19

The article of Claim 18, wherein each of the first layer, second layer and the third layer, independently, comprise a thickness 25 to 500 micrometers.

Embodiment 20

The article of Claim 19, wherein the thickness is 25 to 300 micrometers.

Embodiment 21

The article of Claim 20, wherein the thickness is 25 to 200 micrometers.

Embodiment 22

The article of any of Claims 18 to 21, wherein the article includes a substrate comprising a visible transmission of less than or equal to 10% according to ASTM D1003-00, Procedure A, using D65 illumination, 10 degrees observer, at a thickness of 1 mm.

Embodiment 23

The article of any of Claims 18 to 22, wherein the article includes the substrate, wherein the substrate has a substrate thickness of greater than 500 micrometers.

Embodiment 24

The article of any of Claims 18 to 23, wherein the article includes the substrate, and wherein the substrate is a non-white substrate.

Embodiment 25

A multilayered article for laser marking comprising: a first layer having a visible transmission of greater than or equal to 80% according to ASTM D1003-00, Procedure A, using D65 illumination, 10 degrees observer, at a thickness of the first layer in the multilayer article; a second layer having a visible transmission of greater than or equal to 80% according to ASTM D1003-00, Procedure A, using D65 illumination, 10 degrees observer, at a thickness of the second layer in the multilayer article, and wherein the second layer comprises an active component that will form a laser mark with an L* of less than or equal to 40 as measured according to CIELAB 1976 (specular included), when exposed to a laser light of a wavelength of greater than 800 nm; and a non-white substrate.

Embodiment 26

The article of Claim 25, wherein non-white comprises dE of greater than 10 compared with a RAL 9010 background.

Embodiment 27

The article of any of Claims 25 to 26, wherein non-white comprises dE of greater than 20 compared with a RAL 9010 background.

Embodiment 28

The article of any of Claims 18 to 27, comprising the substrate having a visible transmission of less than or equal to 10% according to ASTM D1003-00, Procedure A, using D65 illumination, 10 degrees observer, at a thickness of 1 mm.

Embodiment 29

A multilayered article, comprising: a first layer having a visible transmission of greater than or equal to 80% according to ASTM D1003-00, Procedure A, using D65 illumination, 10 degrees observer, at a thickness of the first layer in the multilayer article; and a second layer, active to laser light having a wavelength less than or equal to 500 nm, wherein the second layer is active via an active component that will form a laser mark with an L* of less than or equal to 40 when exposed to a laser light of a wavelength of less than or equal to 500 nm; wherein the article comprises a laser mark having a mark L* less than or equal to 40, as measured according to CIELAB 1976 (specular included).

Embodiment 30

The article of any of Claims 18 to 29, wherein the article comprises a laser mark having an L* of less than or equal to 35 as measured according to CIELAB 1976 (specular included).

Embodiment 31

The article of any of Claims 18 to 30, wherein the article comprises a laser mark having an L* of less than or equal to 25 as measured according to CIELAB 1976 (specular excluded).

Embodiment 32

The article of any of Claims 18 to 31, wherein the second layer comprises less than or equal to 500 ppm of a UV absorbing additive.

Embodiment 33

The article of any of Claims 18 to 32, wherein the second layer comprises less than or equal to 200 ppm of a UV absorbing additive.

Embodiment 34

The article of any of Claims 18 to 33, wherein the second layer comprises less than or equal to 100 ppm of a UV absorbing additive.

Embodiment 35

The article of any of Claims 23 to 34, further comprising a third layer having a transmission of less than 30% at the laser wavelength according to ASTM D1003-00, Procedure A, using D65 illumination, 10 degrees observer, at a thickness of the third layer in the article.

Embodiment 36

The article of Claim 35, wherein the third layer has a transmission of less than 10% at the laser wavelength according to ASTM D1003-00, Procedure A, using D65 illumination, 10 degrees observer, at a thickness of the third layer in the article.

Embodiment 37

The article of any of Claims 18-36, wherein the substrate comprises thermoplastic polymer, and wherein the thermoplastic polymer has a visible transmission of greater than or equal to 70% according to ASTM D1003-00, Procedure A, using D65 illumination, 10 degrees observer, and thickness of 1 mm.

Embodiment 38

The article of any of Claims 18-37, wherein the thermoplastic polymer has a visible transmission of greater than or equal to 80% according to ASTM D1003-00, Procedure A, using D65 illumination, 10 degrees observer, and thickness of 1 mm.

Embodiment 39

The article of any of Claims 37 to 38, wherein the article further comprises a white mark.

Embodiment 40

The article of any of Claims 37 to 39, wherein the laser mark is capable of fluorescing.

Embodiment 41

A method of inscribing a substrate, comprising: contacting the substrate with a laser beam to generate a laser mark, wherein the mark results from increasing the reflectivity of the thermoplastic material, wherein the substrate comprises a composition comprising a non-reflective thermoplastic material.

Embodiment 42

The method of Claim 41, wherein the composition comprises a non-reflective thermoplastic material capable of absorbing light having a wavelength of less than or equal to 500 nanometers.

Embodiment 43

The method of any of Claims 41 to 42, wherein the composition further comprises an ultraviolet absorbing additive capable of absorbing light having a wavelength of less than or equal to 500 nanometers.

Embodiment 44

The method of Claim 43, wherein the ultraviolet absorbing additive is selected from hydroxybenzophenones, hydroxybenzotriazoles, hydroxybenzotriazines, cyanoacrylates, oxanilides, benzoxazinones, benzylidene malonates, hindered amine light stabilizers, nano-scale inorganics, and combinations comprising at least one of the foregoing.

Embodiment 45

The method of any of Claims 41 to 44, wherein the substrate has a maximum reflection in the visible spectrum represented by an L* value of less than 25 when measured with a black background according to ASTM E308-08 and CIELAB 1976 (specular included).

Embodiment 46

The method of any of Claims 41 to 45, wherein the L* value is less than 20 (specular included).

Embodiment 47

The method of any of Claims 41 to 46, wherein the substrate is un-pigmented.

Embodiment 48

The method of any of Claims 41 to 47, wherein the laser beam has a wavelength less than or equal to 500 nanometers.

Embodiment 49

The method of any of Claims 41 to 48, wherein the mark is a watermark.

Embodiment 50

The method of any of Claims 41 to 49, wherein the watermark has a profile height of less than 15 micrometers.

Embodiment 51

The method of any of Claims 41 to 50, wherein the profile height is less than 10 micrometers.

Embodiment 52

The method of any of Claims 41 to 48, wherein the mark is a light colored mark.

Embodiment 53

The method of Claim 52, wherein the light colored mark has a profile height of less than 35 micrometers.

Embodiment 54

The method of Claim 53, wherein the profile height is less than 30 micrometers.

Embodiment 55

The method of any of Claims 41 to 54, wherein the composition is colored.

Embodiment 56

The method of any of Claims 41 to 55, wherein the mark is a white mark.

Embodiment 57

The method of any of Claims 41 to 56, wherein the composition is further inscribed with a laser beam having a wavelength greater than 500 nm to achieve a dark mark.

Embodiment 58

The method of any of Claims 41 to 57, wherein the substrate has a visible transmission of greater than 70% as measured according to ASTM D1003-00, Procedure A, using D65 illumination, 10 degrees observer, and thickness of 1 mm.

Embodiment 59

The method of Claim 58, wherein the visible transmission is greater than 75%.

Embodiment 60

The method of any of Claims 54 to 59, wherein the visible transmission is greater than 80%.

Embodiment 61

The method of any of Claims 41 to 60, wherein the composition comprises a material selected from the group consisting of polycarbonate, polycarbonate copolymers, polyester, polymethyl methacrylate, polystyrene, polyamide, polyolefin, polyvinyl chloride, polyimide, polyetherimide, polylactic acid, and combinations comprising at least one of the foregoing.

Embodiment 62

The method of any of Claims 41 to 61, wherein the mark has an increase in L* of greater than or equal to 20 compared to the thermoplastic material.

Embodiment 63

The method of any of Claims 41 to 62, wherein the mark has an increase in L* of greater than or equal to 25 compared to the thermoplastic material.

Embodiment 64

The method of any of Claims 41 to 63, wherein the mark comprises individual laser inscribed dots having a diameter of less than or equal to 80 micrometers.

Embodiment 65

The method of Claim 64, wherein the diameter is less than or equal to 60 micrometers.

Embodiment 66

The method of any of Claims 64 to 65, wherein the diameter is less than or equal to 40 micrometers.

Embodiment 67

The method of any of Claims 41 to 48 and 52-66, wherein the mark has a reflection greater than 15% in a marked side of the article and where the reflection from the opposite side is more than half that on the marked side (for example, the marked side of the article is the side contacted by the laser that forms the laser mark).

Embodiment 68

A method of attaching a first component to a second component, comprising: contacting a first component comprising a first component composition and a second component comprising a second component composition with an ultraviolet laser beam having a wavelength less than or equal to 500 nanometers, wherein the first component composition comprises a non-reflective thermoplastic material that is transparent to laser light having a wavelength less than or equal to 500 nanometers and wherein the second component composition comprises a non-reflective thermoplastic material capable of absorbing light having a wavelength less than or equal to 500 nanometers; and generating an interaction between the first component and the second component to attach the first component to the second component.

Embodiment 69

The method of Claim 68, further comprising generating a mark on the second component.

Embodiment 70

A method for generating a mark on an article, comprising: bonding a first component to a second component with a laser beam having a wavelength of greater than or equal to 800 nanometers, wherein the first component composition comprises a thermoplastic composition absorbing light having a wavelength of less than or equal to 500 nanometers and wherein the second component comprises a thermoplastic composition absorbing light having a wavelength of greater than or equal to 800 nanometers.

Embodiment 71

An article formed by the method of any of Claims 41 to 70.

Embodiment 72

The article of any of Claims 1-40 and 70, wherein the article comprises an authentication identifier on an identification document, a thermoplastic glazing, a business card, a gift card, a ticket, an electronic housing, a television bezel, optical glassware, and combinations comprising at least one of the foregoing.

Embodiment 73

A method of making a consistent black mark (having an L* less than or equal to 40, as measured according to CIELAB 1976 (specular included)), in an article, comprising: decoupling an active component from a substrate, locating the active component in a layer between the substrate and an outer layer (also referred to herein as a first layer), wherein the outer layer has a visible transmission of greater than or equal to 80% according to ASTM D1003-00, Procedure A, using D65 illumination, 10 degrees observer, at a thickness of the first layer in the multilayer article; contacting the active component with a laser light to form a mark having an L* of less than or equal to 40 as measured according to CIELAB 1976 (specular included).

Embodiment 74

The method of Embodiment 73, wherein the substrate has a color (e.g., the substrate is not white or black).

Embodiment 75

The method of any of Embodiments 73-74, wherein the laser light has a wavelength of less than or equal to 500 nm.

Embodiment 76

The method of any of Embodiments 73-75, wherein the laser light has a wavelength of less than or equal to 400 nm.

Embodiment 77

The method of any of Embodiments 73-74, wherein the laser light has a wavelength of greater than or equal to 800 nm.

Embodiment 78

The method of any of Embodiments 73-77, wherein the mark is produced by chemical rearrangement.

Embodiment 79

The method of any of Embodiments 73-78, wherein the mark is capable of fluorescing.

Embodiment 80

The article of any of Claims 1-15, wherein the article is monolithic.

Embodiment 81

The article of any of Claims 1-15, wherein the article is one layer only, not multilayered.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to differentiate one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. "Optional" or "optionally" means that the subsequently described event or circumstance can or cannot occur, and that the description includes instances where the event occurs and instances where it does not.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. In addition, it is to be understood that the described elements may be combined in any suitable manner in the various embodiments.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. An article, comprising:
   a layer E including a light mark and comprising a thermoplastic composition capable of absorbing light having a wavelength less than or equal to 500 nanometers, wherein layer E has a front side and a rear side;
   wherein the light mark was formed by contacting the front side of the layer E with a laser light having a wavelength of less than or equal to 500 nanometers;
   wherein the light mark resulted from an increase in reflectivity of the thermoplastic composition contacted by the laser light;
   wherein the layer E has a visible transmission of greater than or equal to 80% according to ASTM D1003-00, Procedure A, using D65 illumination, 10 degrees observer, and at a thickness of 1 mm;
   wherein when measuring the light mark from the front side, the light mark measured from the front side has a front side mark L* measured according to CIELAB 1976 (specular included);
   wherein when measuring the light mark from the rear side, the light mark measured from the rear side has a rear side mark L* measured according to CIELAB 1976 (specular included) and a rear side average percent reflection of 11.5 to 25.3 as measured according to ASTM D1003-00 using D65 illumination and 10 degrees observer at a thickness of 1 mm; and
   wherein a delta between the front side mark L* and the rear side mark L* is 1 to 10.

2. The article of claim 1, further comprising
   a layer C having a visible transmission of greater than or equal to 80% according to ASTM D1003-00, Procedure A, using D65 illumination, 10 degrees observer, at a thickness of the layer C in the multilayer article, wherein the layer C has a dark laser mark;

wherein the layer C comprises an additive that will form the dark laser mark with an L* of less than or equal to 40 as measured according to CIELAB 1976 (specular included); and wherein the dark laser mark was formed by contacting the layer C, through layer E, with a laser light having a wavelength of greater than 800 nm.

3. The article of claim 2, wherein the layer C comprises an additive, and wherein the additive comprises at least one of carbon black, a nano-scale inorganic, and a metal oxide.

4. The article of claim 2, further comprising a substrate comprising a dE of greater than 10 compared with a RAL 9010 background, wherein the layer C is between the substrate and the layer E.

5. The article of claim 1, further comprising a layer A having a visible transmission of greater than or equal to 80% according to ASTM D1003-00, Procedure A, using D65 illumination, 10 degrees observer, at a thickness of the layer A in the article; and a layer C, wherein the layer C has a dark laser mark, and wherein the layer C comprises an additive that will form the dark laser mark when contacted with a laser light having a wavelength of less than 500 nm;

wherein the layer C has a visible transmission of greater than or equal to 80% according to ASTM D1003-00, Procedure A, using D65 illumination, 10 degrees observer, at a thickness of the layer C in the article;

wherein the dark laser mark that was formed when the layer C was contacted, through the layer A, with a laser light having a wavelength of less than 500 nm;

wherein the dark laser mark has an L* of less than or equal to 40 as measured according to CIELAB 1976 (specular included); and wherein the layer C is between the layer E and the layer A.

6. The article of claim 5, wherein the additive comprises at least one of carbon black, a nano-scale inorganic, metal oxide.

7. The article of claim 6, wherein the layer C comprises less than or equal to 500 ppm of the additive.

8. The article of claim 6, wherein the additive comprises at least one of lanthanum hexaboride and cesium tungsten oxide.

9. The article of claim 1, wherein the light mark is a watermark.

10. The article of claim 1, wherein the layer E further comprises at least one ultraviolet absorbing component selected from hydroxybenzophenones, hydroxybenzotriazoles, hydroxybenzotriazines, cyanoacrylates, oxanilides, benzoxazinones, benzylidene malonates, and hindered amine light stabilizers, and nano-scale inorganics.

11. The article of claim 1, further comprising a layer A having a visible transmission of greater than or equal to 80% according to ASTM D1003-00, Procedure A, using D65 illumination, 10 degrees observer, at a thickness of the layer A in the article; and a dark laser mark having an L* of less than or equal to 40 as measured according to CIELAB 1976 (specular included);

wherein the dark laser mark was formed by contacting the layer E, through the layer A, with a laser light having a wavelength of greater than 800 nm; and wherein the layer E comprises at least one additive selected from carbon black, a nano-scale inorganic, and metal oxide.

12. The article of claim 11, wherein the layer E further comprises at least one ultraviolet absorbing component selected from hydroxybenzophenones, hydroxybenzotriazoles, hydroxybenzotriazines, cyanoacrylates, oxanilides, benzoxazinones, benzylidene malonates, hindered amine light stabilizers, and nano-scale inorganics.

13. The article of claim 1, wherein the light mark comprises individual laser inscribed microdots having a diameter of less than or equal to 80 micrometers.

14. The article of claim 1, wherein the light mark is a UV fluorescent mark that is a result of a change in optical properties in the region 400 nm to 700 nm when exposed to light having a wavelength less than or equal to 500 nm.

15. The article of claim 1, wherein the article comprises an authentication identifier on an identification document, a thermoplastic glazing, a business card, a gift card, a ticket, an electronic housing, a television bezel, optical glassware.

16. The article of claim 1, wherein the article is selected from a glazing part, pharmaceutical packaging, food packaging, electronic housing, electronic screen, eyewear lens, eyewear frame, card, and ticket.

17. A method of forming an article with a dark laser mark and a light mark, comprising:

locating a layer C between a layer E and a layer A; and directing a laser light having a wavelength of less than or equal to 500 nanometers at a layer E to increase reflectivity of an area contacted by the laser light and to form the light mark; and forming the dark laser mark in layer C, wherein the dark laser mark has an L* of less than or equal to 40 as measured according to CIELAB 1976 (specular included);

wherein the layer A has a visible transmission of greater than or equal to 80% according to ASTM D1003-00, Procedure A, using D65 illumination, 10 degrees observer, at a thickness of the layer A in the article;

wherein the layer E comprises a thermoplastic composition capable of absorbing light having a wavelength less than or equal to 500 nanometers; and has a visible transmission of greater than or equal to 80% according to ASTM D1003-00, Procedure A, using D65 illumination, 10 degrees observer, and at a thickness of 1 mm;

wherein when measuring the light mark from the front side, the light mark measured from the front side has a front side mark L* measured according to CIELAB 1976 (specular included);

wherein when measuring the light mark from the rear side, the light mark measured from the rear side has a rear side mark L* measured according to CIELAB 1976 (specular included) and a rear side average percent reflection of 11.5 to 25.3 as measured according to ASTM D1003-00 using D65 illumination and 10 degrees observer at a thickness of 1 mm; and wherein a delta between the front side mark L* and the rear side mark L* is 1 to 10.

18. The article of claim 1, wherein the rear side average percent reflection is 14.7 to 25.3.

19. The article of claim 1, wherein the delta between the front side mark L* and the rear side mark L* is 1 to 8.

* * * * *